United States Patent [19]
Lewis

[11] Patent Number: 5,564,001
[45] Date of Patent: Oct. 8, 1996

[54] METHOD AND SYSTEM FOR INTERACTIVELY TRANSMITTING MULTIMEDIA INFORMATION OVER A NETWORK WHICH REQUIRES A REDUCED BANDWIDTH

[75] Inventor: Scott W. Lewis, Saratoga, Calif.

[73] Assignee: Multimedia Systems Corporation, San Jose, Calif.

[21] Appl. No.: 265,391

[22] Filed: Jun. 24, 1994

Related U.S. Application Data

[63] Continuation-in-part of Ser. No. 975,824, Nov. 11, 1992, Pat. No. 5,325,423.

[51] Int. Cl.$^6$ .............................. H04M 11/00; H04N 7/00
[52] U.S. Cl. .............................. 395/154; 379/90; 379/93; 348/12; 348/14
[58] Field of Search .............................. 395/154; 379/97, 379/100, 102, 122, 140, 90, 93, 96, 98; 358/425, 442; 370/122; 348/12–14

[56] References Cited

U.S. PATENT DOCUMENTS

| | | | |
|---|---|---|---|
| 4,897,867 | 1/1990 | Foster et al. | 379/94 |
| 5,195,092 | 3/1993 | Wilson et al. | 370/94.2 |
| 5,220,420 | 6/1993 | Hoarty et al. | 348/12 |
| 5,236,199 | 8/1993 | Thompson, Jr. | 273/439 |
| 5,251,209 | 10/1993 | Jurkevich et al. | 370/67 |
| 5,283,819 | 2/1994 | Glick | 379/90 |
| 5,325,423 | 6/1994 | Lewis | 379/90 |
| 5,351,276 | 9/1994 | Doll, Jr. et al. | 379/67 |

OTHER PUBLICATIONS

*Webster's II New Riverside University Dictionary*, 1994, p. 950.

*Primary Examiner*—Mark K. Zimmerman
*Assistant Examiner*—Stephen Hong
*Attorney, Agent, or Firm*—Benman Collins & Sawyer

[57] ABSTRACT

A system and device is provided that enhances the interactivity of multimedia information across a communications network or in combination with other networks including telecommunication and cable broadcasting. The system includes an interactive multimedia mastering (IMM) system for receiving multimedia program materials from a program source, a multimedia call processing system (MCPS) coupled to the IMM, and a plurality of interactive multimedia devices (IMDs) for distributing multimedia information to users. The IMM optimizes the program materials by separating the information into primary and secondary layers using psychographic parameters to differentiate between important and less important multimedia information, and then compresses at least a portion of the layers for transmission to the MCPS. The IMDs accept user commands for multimedia information from a telephone, which cause the IMD to transmit a control signal to the MCPS. The MCPS receives the control signal while in a voice mode, and in response, branches to a program branch in the optimized program materials indicated by the control signal. The MCPS switches to a data mode for transmitting data from the indicated program branch back to the requesting IMD, and then switches back to the voice mode to accept further control signals from the IMD. Once the IMD receives the materials, the IMD decompresses any compressed portions and mixes the decompressed portions with the uncompressed portions to provide enhanced interactive multimedia information to the user.

32 Claims, 14 Drawing Sheets

IMAGE FILE

MIDI FILE

METHOD AND SYSTEM FOR INTERACTIVELY TRANSMITTING MULTIMEDIA INFORMATION OVER A NETWORK WHICH REQUIRES A REDUCED BANDWIDTH

CROSS REFERENCE TO RELATED APPLICATION

This application is a continuation-in-part (CIP) of application Ser. No. 07/975,824 filed Nov. 11, 1992, now U.S. Pat. No. 5,325,423.

FIELD OF THE INVENTION

The present invention relates to a method and system for the production, transmission and reception of multimedia information over a communication network and more particularly to the production, transmission and reception of multimedia information with enhanced interactivity over such a network.

BACKGROUND OF THE INVENTION

Multimedia information can be transmitted in a variety of applications over a network. What is meant by multimedia information is information that has several parameters which can be enhanced or diminished depending upon the importance of the particular information being conveyed. For example, in a video environment there may be foreground and background information that is to be provided to a screen. The screen can typically be a video screen or a computer screen. The most common example of that type of system is an interactive video system such as seen on cable television networks (i.e., QVC or Home Shopping Network). These types of systems allow for a viewer to look at the screen and pick the type of product that he/she may want based on reviewing the information on the screen and then calling a particular telephone number to purchase the product.

Multimedia information can also be audio information in which news, weather, music and like could be transmitted with the use of background information such as white noise, background music or other information to complete the transmission. Multimedia information can also be a combination of graphics, video and music in an entertainment form such as Karaoke. As has been above mentioned, there are interactive systems presently available that allow for individuals to access certain video, audio and graphics information on a network. All presently known systems have the problem of requiring a significant amount of bandwidth to allow for the quality transmission of the multimedia information.

It is known that multimedia information can require a significant amount of bandwidth. In the case of video information as much as 30 MB/sec. bandwidth is required to send a quality video image along a transmission path. In the case of audio information, as much as 10 MB/sec. bandwidth is required to allow for high quality audio signal to be produced accurately.

What is meant by limited bandwidth can be viewed in two different ways. One way is to view the total available bandwidth at any instant in time. Another way of deciding what the particular bandwidth requirement is by determining the bandwidth that is available over a specified time period.

The available bandwidth therefor can be limited in two ways; first, the overall bandwidth of the network is limited such as in telephone networks where the bandwidth is approximately ten (10) kilohertz. However in this example, the available bandwidth over a specified period of time could be very high because a particular telephone set is not utilized constantly.

On the other hand, in looking at a large bandwidth network such as cable television, although the bandwidth is significant, most of the available bandwidth is utilized for providing the network signals. In such an example, the available bandwidth over a specified period of time might be much less than the above-mentioned telephone system.

Telephone networks have traditionally been used to transmit data or voice information. There are telephone sets that can also transmit video information over telephone lines. For example, American Telephone & Telegraph (AT&T) has introduced a phone called the Videophone which can transmit video images across the telephone network. It is becoming readily apparent that the telephone networks can be used for interactive multimedia information also. However, as has been mentioned above, a typical telephone network has a limited bandwidth to transmit certain information. Particularly when attempting to transmit video information, which might require significant bandwidth, the telephone lines are inadequate to provide quick transmission of a high quality video image.

In addition, in such systems the communication network, such as a telephone network itself, will not provide the enhancement capabilities required to provide the psychographic information that will enhance interactivity. Finally, in a typical telephone network many of the technologies required for such a system has not entered the home. For example, although there are many known video enhancing capabilities, audio enhancing, printing, telephone call processing control systems, and the like in commercial use, those techniques are not typically part of the home environment. Hence, what is needed is an interactive multimedia system that provides high quality information over a telephone network. What is also required is a system that will allow for the production, transmission, and reception of interactive multimedia information that includes enhanced interactivity. What is also needed is a device that can be utilized within the home that can receive and transmit enhanced multimedia information and control a number of other devices for useful purposes.

It is important that such a device be inexpensive to install in the home environment. Furthermore, it is important that the interactive multimedia device be one that when installed does not require the modification of the existing network.

The present invention provides such a system and device to be utilized in conjunction with a communication network such as a telephone network or the like.

SUMMARY OF THE INVENTION

An interactive multimedia communication system is disclosed that can be utilized with a telephone network, a similar switched network or in combination with a broadcast network such as satellite or cable.

The interactive multimedia communication system transmits interactive multimedia information over a communication medium having limited bandwidth. The communication system comprises interactive multimedia mastering (IMM) system means for receiving multimedia program materials from a program source, the IMM system includes means for optimizing the program materials by separating the information into primary and secondary layers using psychographic parameters to differentiate between important and less important multimedia information. The optimized program materials includes a plurality of program branches where each of the branches allows a plurality of functions and data to be accessed in order to replicate the program source. The system further comprises a multimedia call processing system (MCPS) coupled to the IMM for receiving and distributing the optimized program materials from the IMM; and a plurality of interactive multimedia devices (IMDs) for receiving the optimized program materials from the MCPS. The plurality of the IMDs including means for accepting user commands for multimedia information and for responsively transmitting a control signal to the MCPS.

The MCPS further includes a voice mode means responsive to the control signal for branching to a program branch in the optimized program materials indicated by the control signal. The MCPS also includes means for switching to a data mode for transmitting data from the indicated program branch back to the at least one of the plurality of IMDs and then switching back to the voice mode to accept further control signals from the at least one of the plurality of IMDs, whereby only selected portions of the optimized program materials are sent from the MCPS to the IMDs thereby reducing the bandwidth required to transmit the multimedia program materials.

Through such a system and device a system can be utilized with an existing telephone network to produce high quality multimedia information.

BRIEF DESCRIPTION OF THE DRAWINGS

FIG. 2A' is a flow chart of the operation of the system of FIG. 2A.

FIG. 2B' is a flow chart of the operation of the system of FIG. 2B.

DETAILED DESCRIPTION OF THE INVENTION

The present invention relates to an improvement in the transmission and reception of multimedia information when utilizing existing networks. The following description is presented to enable one of ordinary skill in the art to make and use the invention and is provided in the context of a patent application and its requirements. Various modifications to the preferred embodiment will be readily apparent to those skilled in the art and the generic principles and features described herein.

Figure 1:
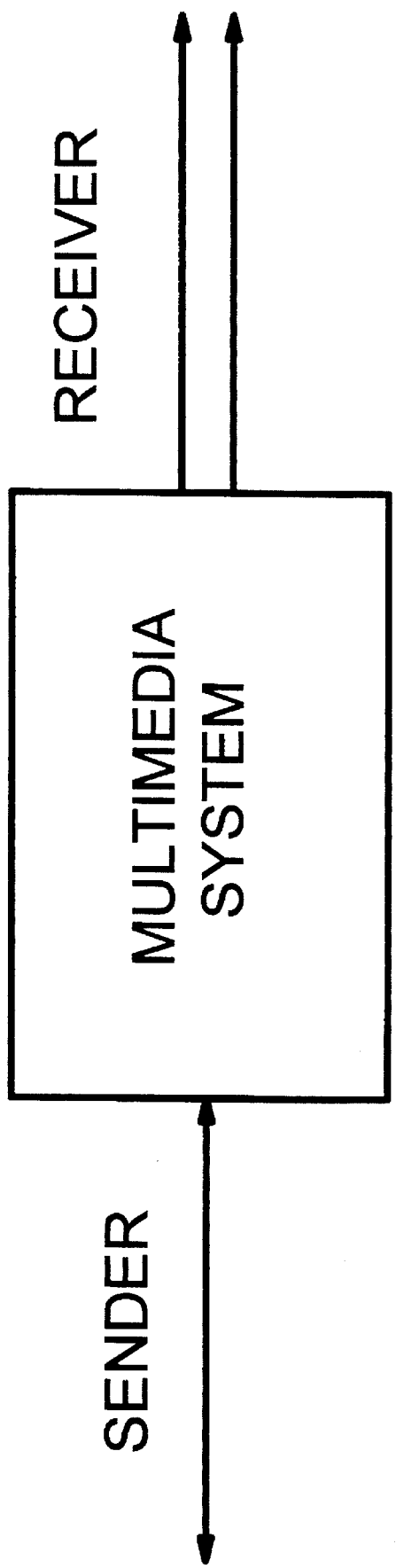
FIG. 1 is a block diagram of a prior art interactive multimedia system.

Referring now to FIG. 1, what is shown in simple block diagram of a prior art interactive multimedia system 10. In such a system 10, a sender sends and receives information on one side of system 10 and the receiver sends and receives information on the other side of the system 10. The system 10 can be a single device such as a CD-ROM player or a network capable of fully interactive (2-way) multimedia transmission.

Before the present invention is described in detail certain background information should be discussed to clarify the utility of the present invention in terms of existing multimedia systems. In a multimedia system, various sensory information is provided to a receiver. In the case of video information, this information takes the form of foreground and background images that display a particular scene. In the case of audio information, the foreground and background signals are such that the foreground information is speech and the background information is music.

Typically, multimedia systems in whatever form provide this information over a single transmission line. In so doing, the amount and quality of the multimedia information is severely limited by the bandwidth of the transmission line.

The present invention first differentiates between important and less important multimedia information by separating the information into primary and secondary layers through the use of a program model to minimize the bandwidth limitations. In such a system each layer will have its own set of parameters that are important psychographically, however, the secondary layer will not vary as much as the primary layer.

What is meant by a program model refers to psychographic parameters within the multimedia system, that is parameters that relate to an individual's sensory perceptions when encountering multimedia information. These parameters comprise a set of unique and consistent elements for a particular class of multimedia information. In accordance with the present invention, its multimedia information is separated into different layers in accordance with the program model. Therefore, by way of example, in the instance of video images, the foreground and background information might be divided into different layers. Similarly, in the case of audio information, the news information, weather information, or the like may be one layer whereas the background music may be the other layer.

In the present invention these layers will be divided into primary and secondary layers in accordance with the information's importance relative to the program model. The most important information is identified and enhanced to provide the best quality information to the receiver of the multimedia information.

In the preferred embodiment, the primary layers will be enhanced in such a way to provide a perceived improvement in quality of the multimedia information presented. In one embodiment the secondary layers are presented that may or may not be enhanced. Thereby the important information or the primary layers that are to be transmitted can be identified and selectively enhanced in accordance with the present invention.

In addition, the primary layers generally can be enhanced through critical psychographic parameters take the form of spatial, color, audio, and temporal variables that occur in the primary or secondary layers.

In a communication system such as a telephone network it is important that the multimedia information that is produced, transmitted and received is enhanced in some manner. This is necessary to ensure that high fidelity, high quality information is presented to the viewer. Therefore, it will be possible to bring a superior product into the home environment. It is known, for example, it has been possible to provide video information over the telephone lines. However, it has been a problem sending high quality video information due to the bandwidth requirements that are needed to provide such high quality video information.

Figure 2:
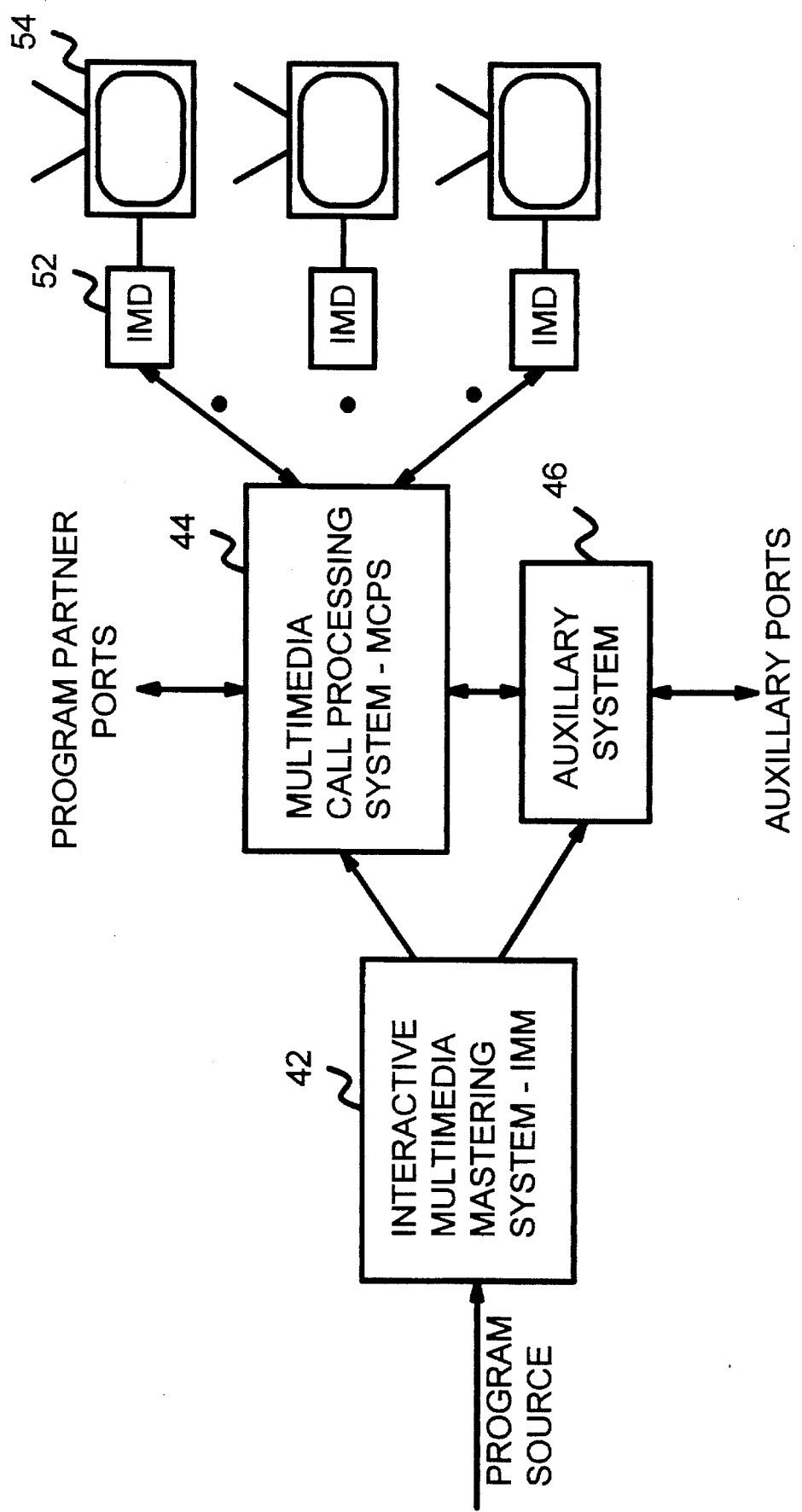
FIG. 2 is a block diagram of an interactive multimedia system for use in a telephone network alone or in combination with a cable tv broadcast feed in accordance with the present invention.
Figure 2A:
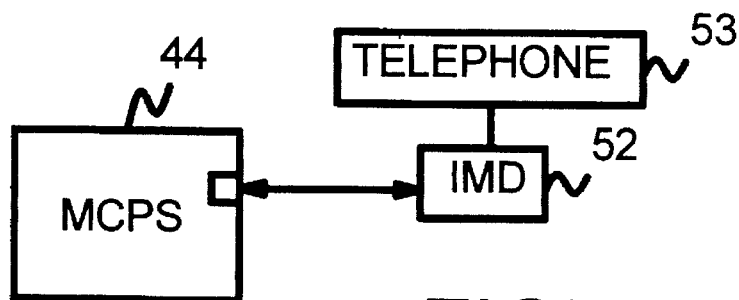
FIG. 2A is a block diagram of a single line connection between a Multimedia Call Processing System (MCPS) and an interactive multimedia device (IMD).
Figure 2A:
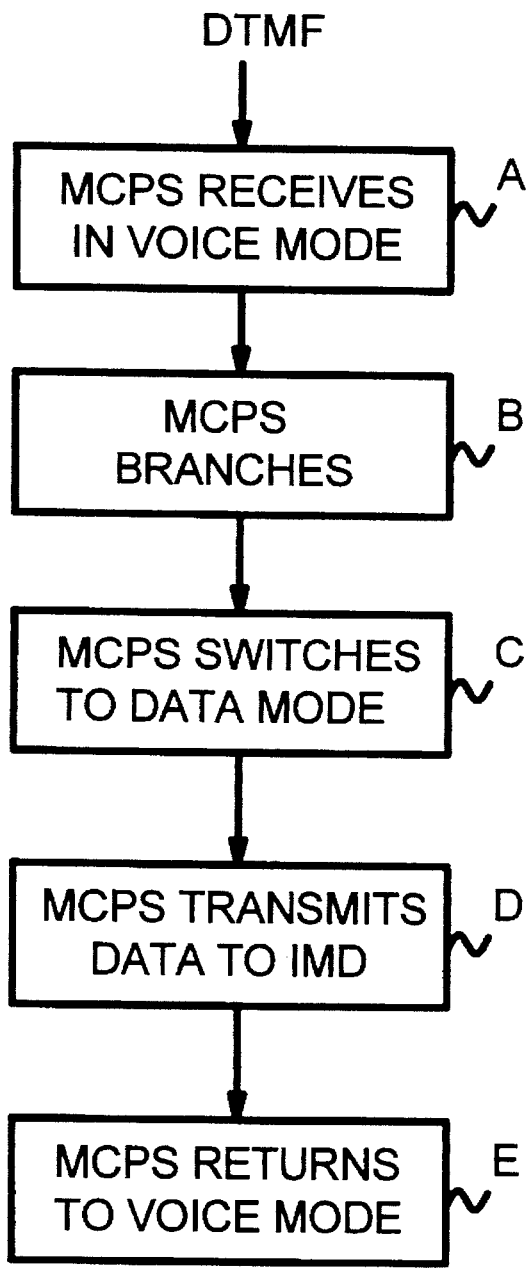
Figure 2B:
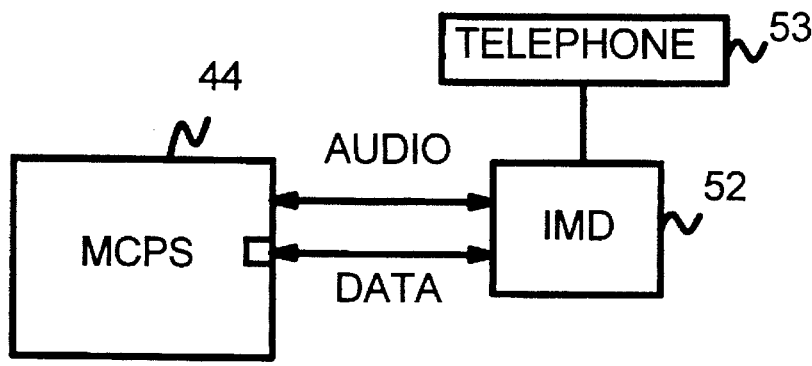
FIG. 2B is a block diagram of a dual line connection between a MCPS and an IMD.
Figure 2B:
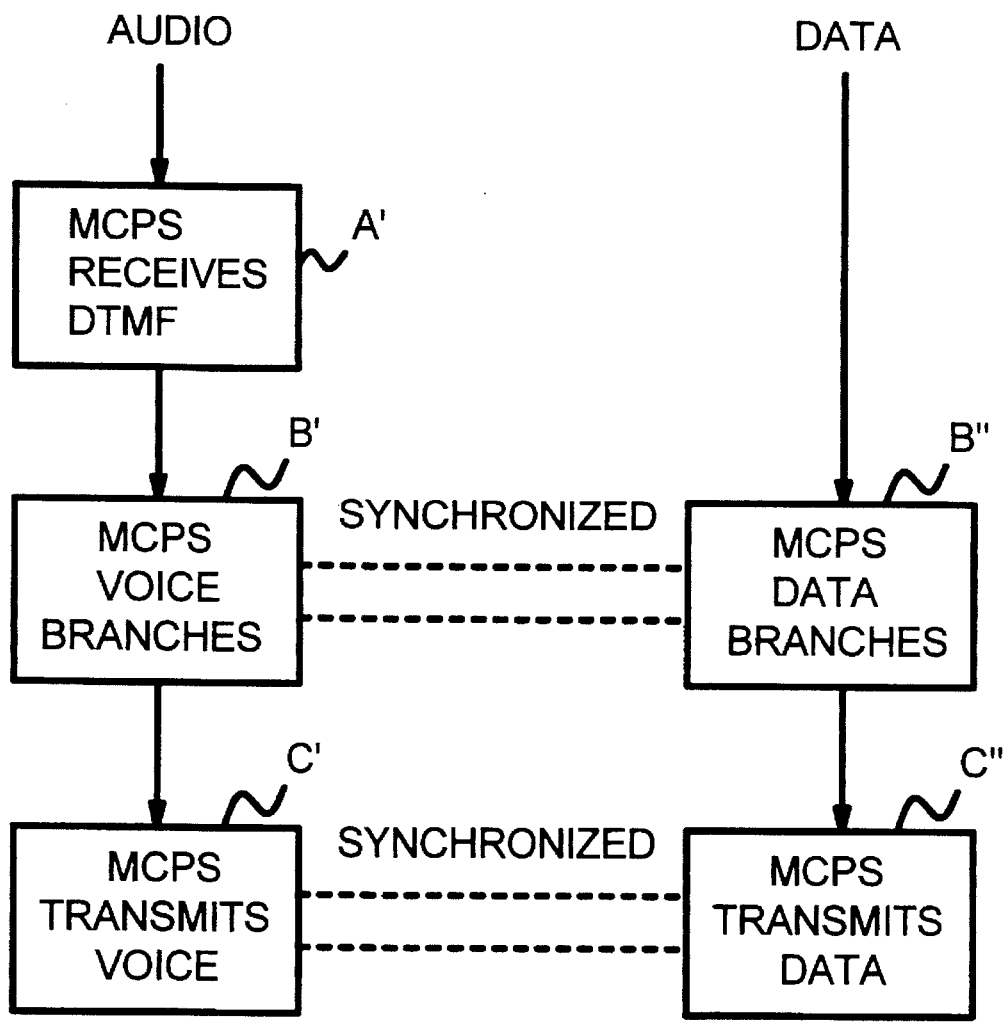

The present invention is directed towards a method and apparatus for enhancing the interactive multimedia information transmitted across a network. To more fully explain such a method and apparatus, refer now to FIG. 2 which is a block diagram of the overall system architecture 40 for an enhanced interactive multimedia system. The overall architecture 40 would be connected to a telephone network or the like so as to readily access the transmission lines located therein. Referring now to FIG. 2, the system architecture 40 comprises an interactive multimedia mastering system (IMM) 42 which receives program source material. The IMM system provides information from the telephone network to a multimedia call processing system (MCPS) 44 and an auxiliary system 46. The multimedia call processing system 44 will provide and receive information from interactive multimedia devices (IMDs) 52. The structure of the IMDs 52 will be described in detail later in this specification. These IMDs 52 can take on many different forms dependent upon how much intelligence is located in an IMD 52 relative to the system architecture 40. FIGS. 2A and 2B are block diagrams illustrating a single line connection between a MCPS 44 and an IMD 52, and a two line connection, respectively. Referring first to the single line arrangement of FIG. 2A and a flow chart 2A', the MCPS 44 provides and receives information from the IMD 52 as follows. The program source material stored in the MCPS 44 are interactively accessed by a user through a telephone 53. An audio command from the telephone 53 causes the IMD 52 to transmit a dual tone multi-frequency (DTMF) signal or control data signal, which is received by the MCPS 44 in a voice mode, in step A.

The program source materials in the MCPS 44 include program branches where each of the branches allows a plurality of functions, commands, and data to be accessed in order to replicate a program model. In response to the DTMF signal, the MCPS 44 branches to an appropriate program branch in the program materials indicated by the control signal according to the program model in step B. Thereafter, the MCPS 44 switches to a data mode in step C, and transmits the data from the program branch back to the IMD 52 in step D. After transmitting the data, the MCPS 44 returns to voice mode in step E to accept further commands.

In the two line system of FIG. 2B, the data is exchanged on one line and audio information, for example, is exchanged on the other line via a multimedia modem (not shown). Referring to FIG. 2B and flow chart of FIG. 2B', in this embodiment, an audio command from the telephone 53 causes the IMD 52 to transmit the DTMF signal, which is received by the MCPS 44 in voice mode, in step A'. In response to the DTMF signal, the MCPS 44 simultaneously branches to an appropriate voice branch and data branch in the program materials according to the program model in steps B' and B". Thereafter, the MCPS 44 will transmit synchronized voice and data from the branches over the dual telephone lines to the IMD 52 in steps C' and C".

The system architecture 40 provides program material which will enhance the interactivity of information that is transmitted along the telephone network. Accordingly, what the system architecture 40 represents, in fact, is an additional network which would receive information from the program source which would also be part of the existing telephone system. The system architecture 40 will then be utilized to provide for enhanced multimedia information through psychographic manipulations or other enhancements to the systems to provide for an improved interactive multimedia system.

The system 40 as above-mentioned includes an IMM 42 that provides much of the optimization of the program source material for presentation to MCPS 44.

Figure 3:
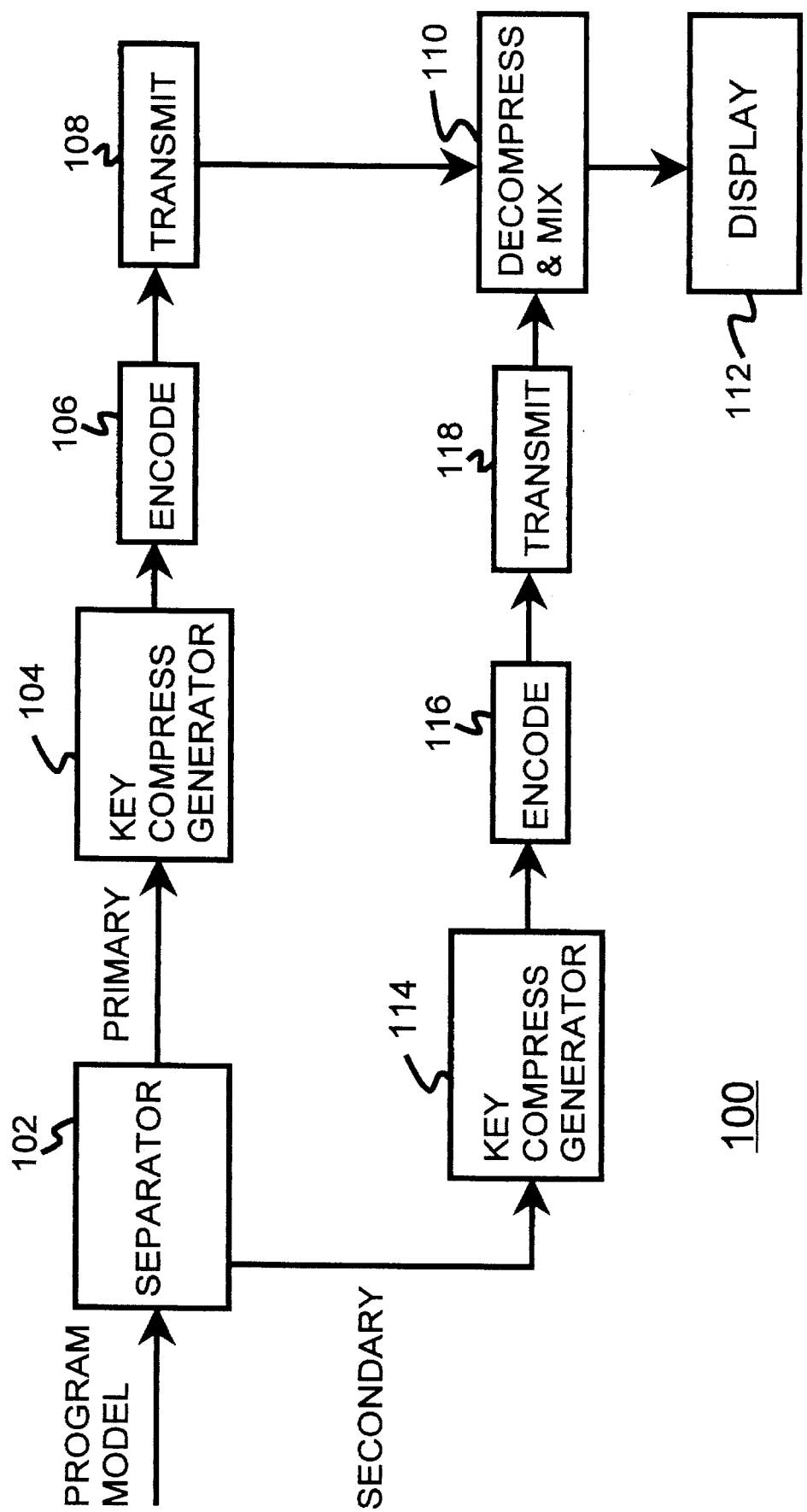
FIG. 3 is a flow chart of a first embodiment of the optimization method which is utilized in a telephone network in accordance with the present invention.

To more specifically describe this optimization technique, refer now to FIG. 3 which is a block diagram of an optimization method in accordance with the present invention. This optimization technique has been described in detail in U.S. patent application Ser. No. 08/369,279, entitled, "*Method for the Production and Transmission of Enhanced Multimedia Information*,", having a filing date of Jan. 5, 1995, assigned to the assignee in the present invention, and that patent application is incorporated by reference in this application. The following paragraphs along with the accompanying figures will provide the details regarding the optimization method and how it will be used advantageously to provide an enhanced interactive multimedia system.

The purpose of the IMM 42 is to provide maximum interactivity while at the same time providing maximum retention of the program model. It is also important that there be minimum transit time for the interactivity while the information has maximum replication. Therefore, it is very important that the program model psychographic parameters be well described. For example, the spatial, color, temporal, audio response, material concept, contention perception all should be very well described and defined in the program model.

Referring now to FIG. 3 what is shown is a first embodiment of a flow chart for providing an enhanced interactive image that utilizes the principles of the present invention. The flow chart 100 comprises the steps of providing a program model to a separator. The separator 102 will divide the information into primary and secondary layers of interactive multimedia information. The separation is automatic and can be accomplished in a variety of ways. For example, the layers can be separated by production sources. In another example, separation can be accomplished through key coding the layers. In yet a third example, the layers can be spatially separated or separated by the various colors. Finally, layers of information could be separated by a filtering process.

The primary layers are provided to the compression generation block 104. There are a variety of ways that the multimedia data can be changed or generated to use less bandwidth. For example, compression algorithms or their equivalents could be utilized to reduce the bandwidth used. In addition generators, such as in a tone generator system, could be utilized to reduce the bandwidth required. Finally, key coding systems could be utilized to reduce bandwidth use. Such systems will be discussed in more detail later in the specification.

In this embodiment, the primary layer is provided to an encoder where the primary layer is prepared for transmission (block 108). Thereafter the primary layer of information is decompressed (block 110). The primary layer is then decoded and mixed with the secondary layer of data information (block 112) to provide an enhanced interactive multimedia image (motion, video or other) or data to a display.

Similarly, the secondary layer is compressed through block 114, encoded (block 116) and then transmitted to block 118 to decompress and mix block 110. The two signals (primary and secondary) are then sent to display 112.

In this embodiment, for example, in the optimization of video images, the primary layer can be the foreground image, the secondary layer can be background information. Through the use of this type of optimization technique multimedia information can be enhanced while at the same time utilizing significantly less bandwidth.

To more fully understand this feature refer now to the following discussion. In a typical interactive multimedia system the information is all sent along one layer. The information that can then be transmitted is limited by the bandwidth of that layer.

In the prior art, the interactive multimedia information that could be transmitted along typical networks or transmission paths are very limited because, for example, in the case of video images the bandwidth is not adequate to provide a high quality image to a display.

Hence, in the present invention, by separating the multimedia information into primary and secondary layers and thereafter compressing the more important information utilizing well known compression algorithms, a system is described that can produce enhanced interactive multimedia information that is easily transmitted over existing networks.

Figure 4:
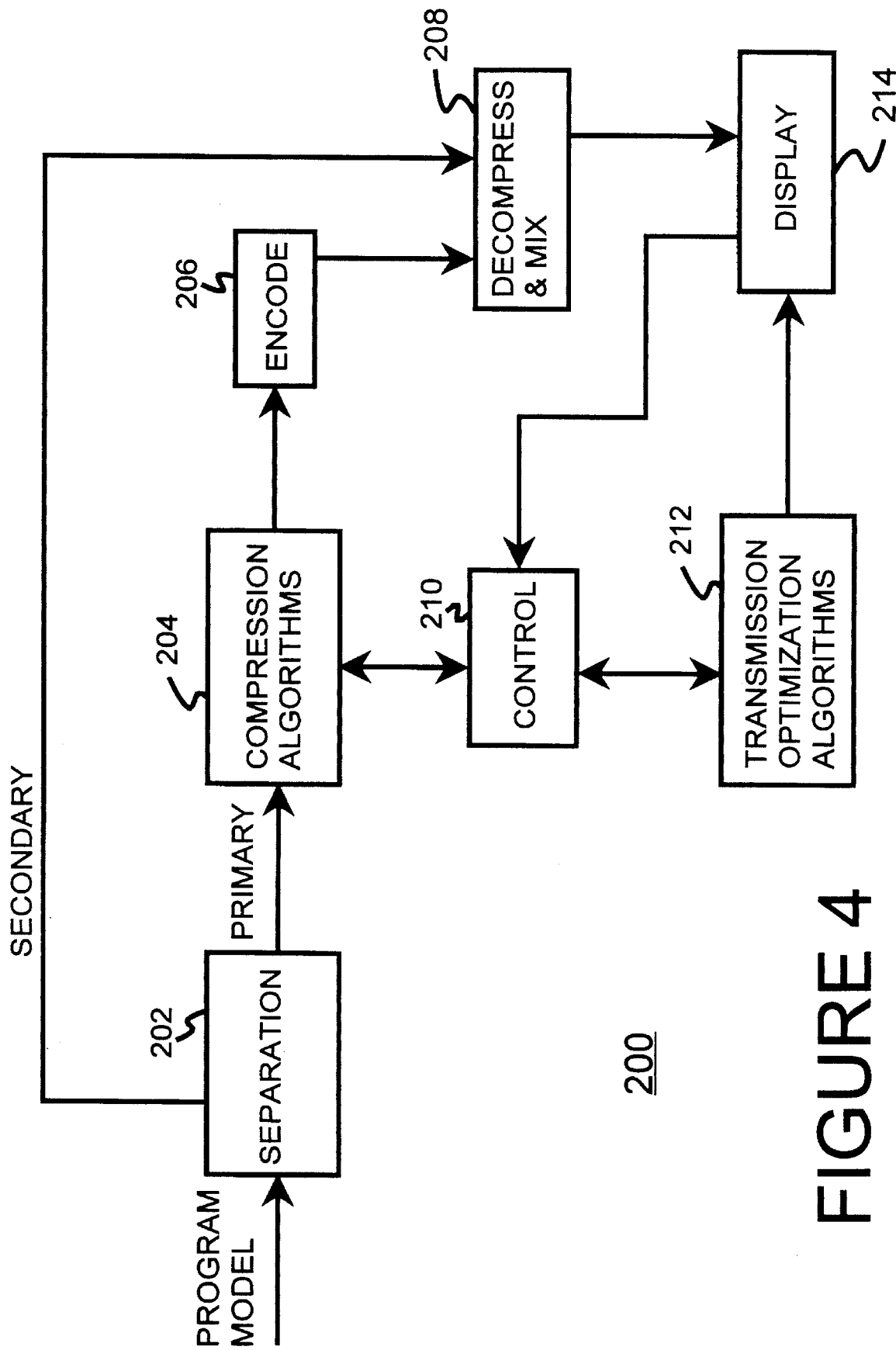
FIG. 4 is a flow chart showing the operation of a second embodiment of an optimization method which is utilized in a telephone network in accordance with the present invention in which a matrix of compression and transmission algorithms are utilized.

To more fully describe the psychographic enhancement feature of the present invention refer now to FIG. 4 which shows the various possibilities from a particular program model. The program model is provided to the separator 42 of the multimedia system.

Psychographic enhancements are critical to the improvement in interactive multimedia transmission and reception. Enhancements in the context of the present application is information that is not transmitted but operates on, operates in conjunction with, or operates as a supplement to transmitted multimedia information. There are three separate categories that will be described that relate to psychographic enhancements.

The first category will be described as a cross correlation between the information that is being transmitted and being enhanced due to the presence of information that is not transmitted. Dithering of image is an example of this in that dithering masks artifacts of images that are present and that improves the image quality. This type of system does not remove the artifacts but actually just masks imperfections. A second example in the audio arena where secondary audio materials such as a sound of an ocean or the like which might mask problems in the audio quality of the primary sound (voice, music or the like).

The second category is where the signal is actually changed without the use of any control signal; for example, through interpolation or some other technique. The typical example of that is a graphic equalizer in which certain frequencies are enhanced depending on the range of the particular device. Another example of the second category is to frequency or amplitude compress a certain signal so as to further enhance the frequencies that are being transmitted. It is also known to use various filters to sharpen or provide certain information that will actually modify the signal without controlling it per se.

Finally, the third category is using the primary and secondary information to drive the other generators that might be present within the multimedia system. This can be utilized to either enhance the multimedia information or enhance the program model. An example of this is the use of real-time graphics frequency spectrum displays to enhance a music juke box type of program model.

Figure 5:
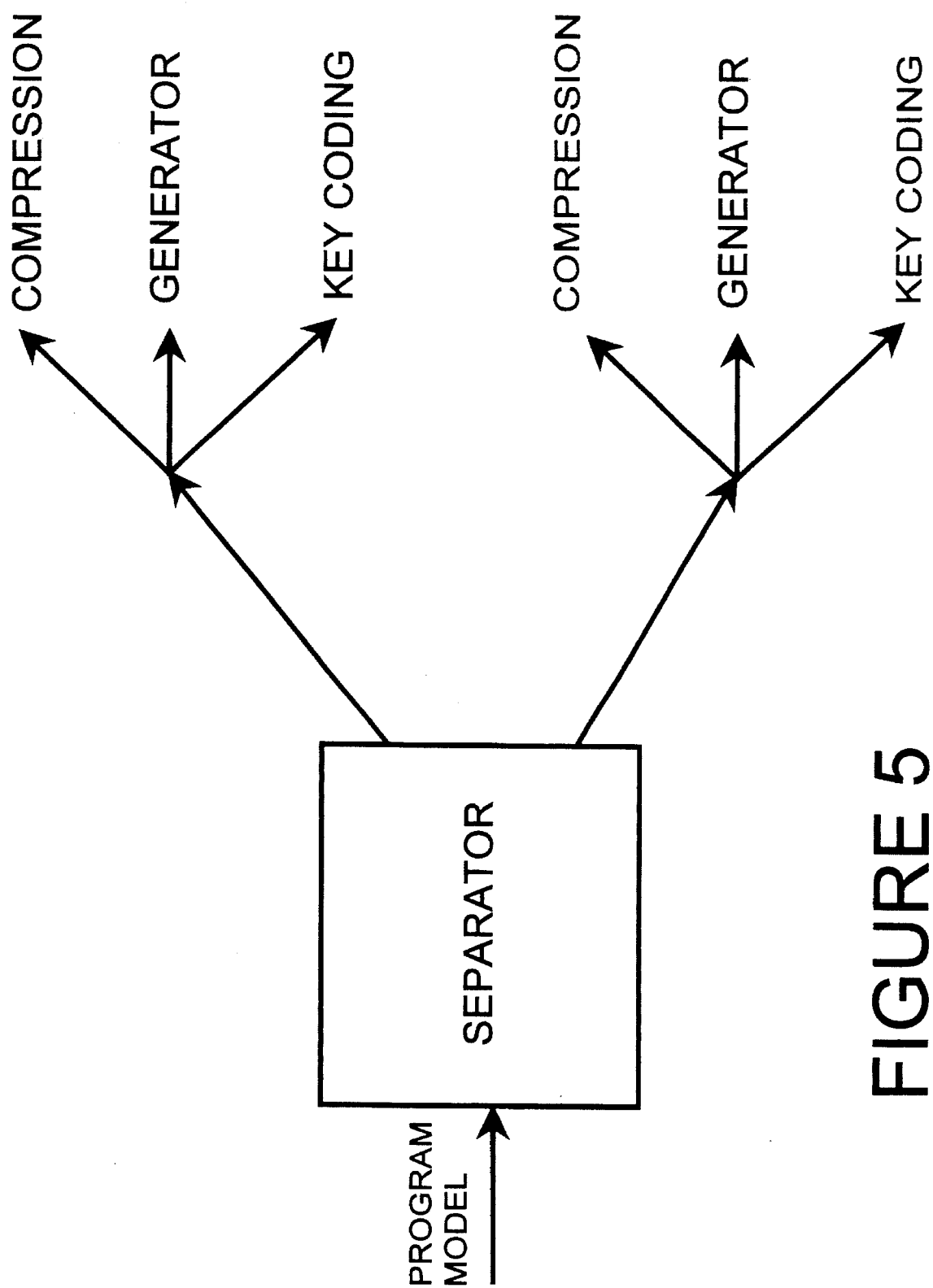
FIG. 5 is a flow chart showing psychographic enhancement in accordance with the present invention.

As shown in FIG. 5, the primary multimedia information layer can be compressed to reduce the bandwidth utilizing well known algorithms. As also shown, that the signal can be replaced by a generator that is responsive to the primary/secondary layers signals. Finally, a key code could be used to cause information to be provided from a look-up table or the like.

Although all of the above methods provide advantages in accordance with the present invention, key coding has some additional non-obvious advantages when utilized in the optimization system of the present invention. In the following paragraphs the use of various key coding systems will be described generally along with their attendant advantages.

Typically, when looking at an interactive multimedia information signal there are several components of that information. The first component is the data or the multimedia information itself that is being conveyed. The second component is referred to as program model dynamics. That is the changes that occur in the interactive multimedia information due to for example, a fade that allows for a transition from one scene in the graphics or video image to another. Conversely, if you want to wipe away an image there is information associated with the multimedia data that would call out for that transition to change efficiently.

Finally, the third category of interactive multimedia information is what will be referred to in this specification which will allow a particular device or system to go from one category to another. In a typical interactive multimedia information system all this information is required to adequately transmit such information.

In its simplest form, a key has an identifiable code which dictates the commands on the other side of the device. The clearest example of such a keying system would be the very simple dual tone multi-frequency (DTMF) signal. This type of signal can be used in the telecommunications area to provide keying for low bandwidth protocol. These keys would then command a code table on the side of the network to provide certain information about the multimedia information to be displayed without requiring actual transmission of the multimedia information.

A more specific version of this type of key coding is what will be referred to in this specification as control information keying. What is meant by controlled information keying is where a key code is utilized to access particular types of commands which can then be used to control other items on the other side of the network.

Such a table would then be utilized to access a certain set of multimedia information in the network. A final version of key coding which will be called program branching keying, is described by each of the keys representing a certain branch identification. Thus in this type of key coding the key is cross referenced to a particular branch of the interactive multimedia program where each of the branches allows plurality of functions or commands to be accessed in order to replicate the program model.

The important feature that is provided by all of these types of keying coding arrangements is that information already present on the network can be utilized. Therefore, the processing power inherent in the network or the system being accessed can be utilized rather than having to have to provide that processing power within the optimization system itself.

It is also important to develop means to improve the transmission quality of the multimedia information, for example, the information may be transmitted utilizing a typical transmission algorithm such a CCITT v.32, or Bell 202 with standard communication file data transfer protocols. The interactive multimedia information could also utilize specialized protocols that are optimized for the particular interactive multimedia information that is to be transmitted. In so doing the algorithm for the compression algorithm can be interactively matrixed with the transmission algorithm to provide the highest quality information with the maximum interactivity with the minimum transmission line.

Referring now to FIG. 4, what is shown is a flow chart that shows the cooperation of the transmission algorithm with the compression algorithm to produce a high quality multimedia image. The flow chart comprises providing a program model in which the primary and secondary layers are separated (block 202). The primary layer is compressed and encoded (blocks 204 and 206).

A control element (block 210) is utilized to control a compression matrix and a transmission matrix. These two matrices comprise a plurality of compression algorithms and transmission algorithm respectively that are interactively controlled such that as the various algorithms are detected, the quality of the multimedia information and the speed of the transmission are interactively determined.

The quality of the information could be determined manually or through the use of some control circuitry in the IMM. It should be understood that these same matrices could also be used on the secondary layer. It was not shown or described for purposes of clarity and simplicity.

Figure 5A:
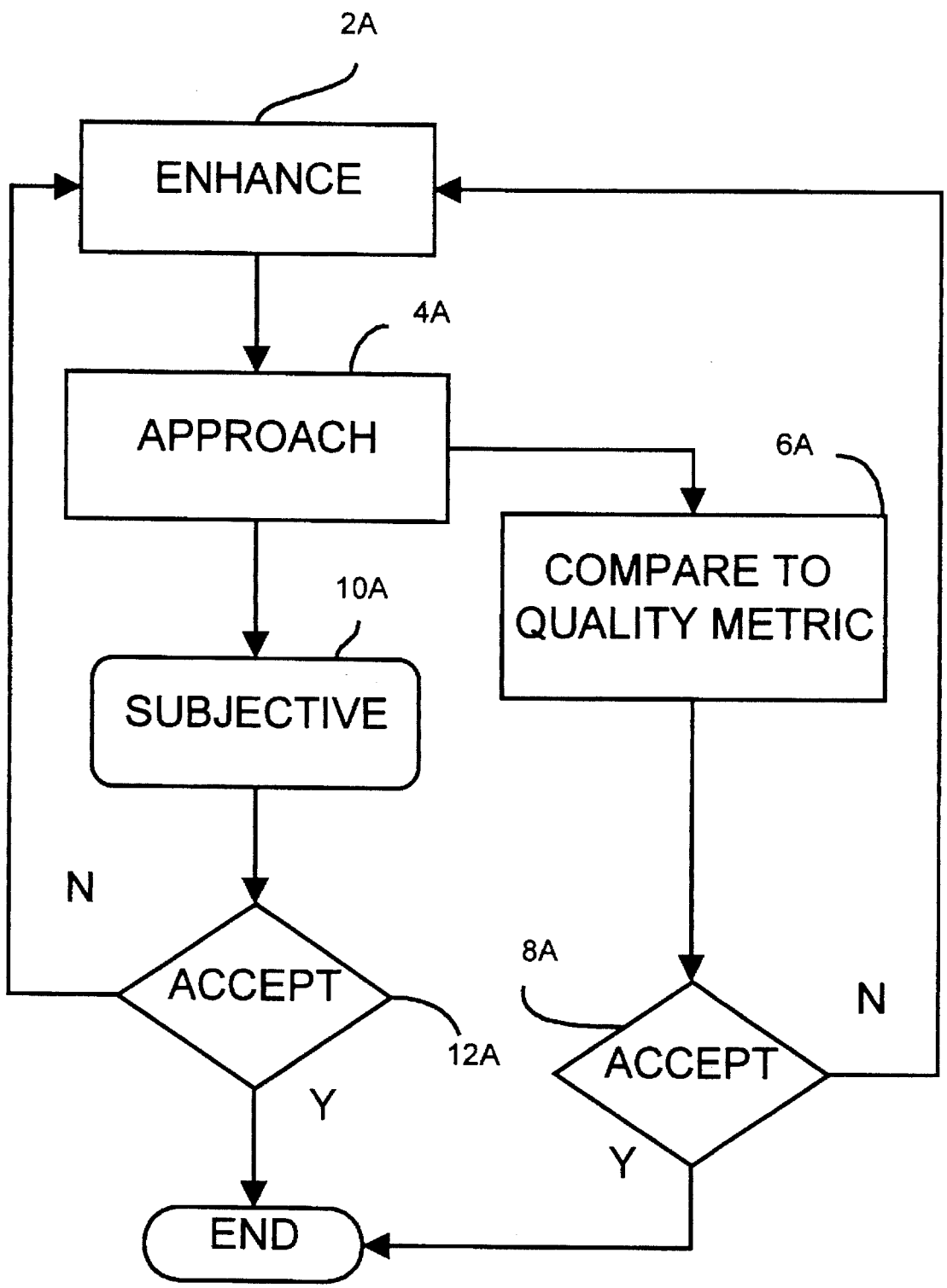
FIG. 5A is a flow chart of a psychographic enhancement system in which both subjective and objective criteria are utilized.

Psychographic quality can be objective or subjective dependent upon the type of system employed. Referring now to the flow chart of FIG. 5A, what is shown is the operation of the system when either objective or subjective criteria is utilized. In this embodiment, the psychographic quality is enhanced by using a specific algorithm via step 2A. For example, a QVC program may show a scene of a wedding ring supported by a ring carrier. Assuming that the wedding ring is defined as a primary layer and the carrier as a secondary layer, the scene may be enhanced by applying an algorithm such as JPEG to one or both layers. Thereafter, it is determined whether to be a subjective quality standard or an objective quality via step 4A. If the standard is an objective quality (such as determining the magnitude of an error or the like) then a comparison is made to the objective quality or size metric (kilobyte storage) via step 6A. Then it must be determined if the enhancement meets the metric via step 8A. If the enhancement meets the metric then the process can end. If the enhancement does not meet the metric then return to step 2A, begin process modification of same algorithm.

If on the other hand the measurement is subjective step 4A; then it must be determined if the enhancement is acceptable to the user. For example, a normal viewer viewing a news program provides an indicator on the output device. If the enhancement is not acceptable then return to step 2A. If the enhancement is acceptable then end. Whether the quality measurement is subjective or objective the enhancement process allows for improved interactivity and enhanced quality of the multimedia information.

Figure 6:
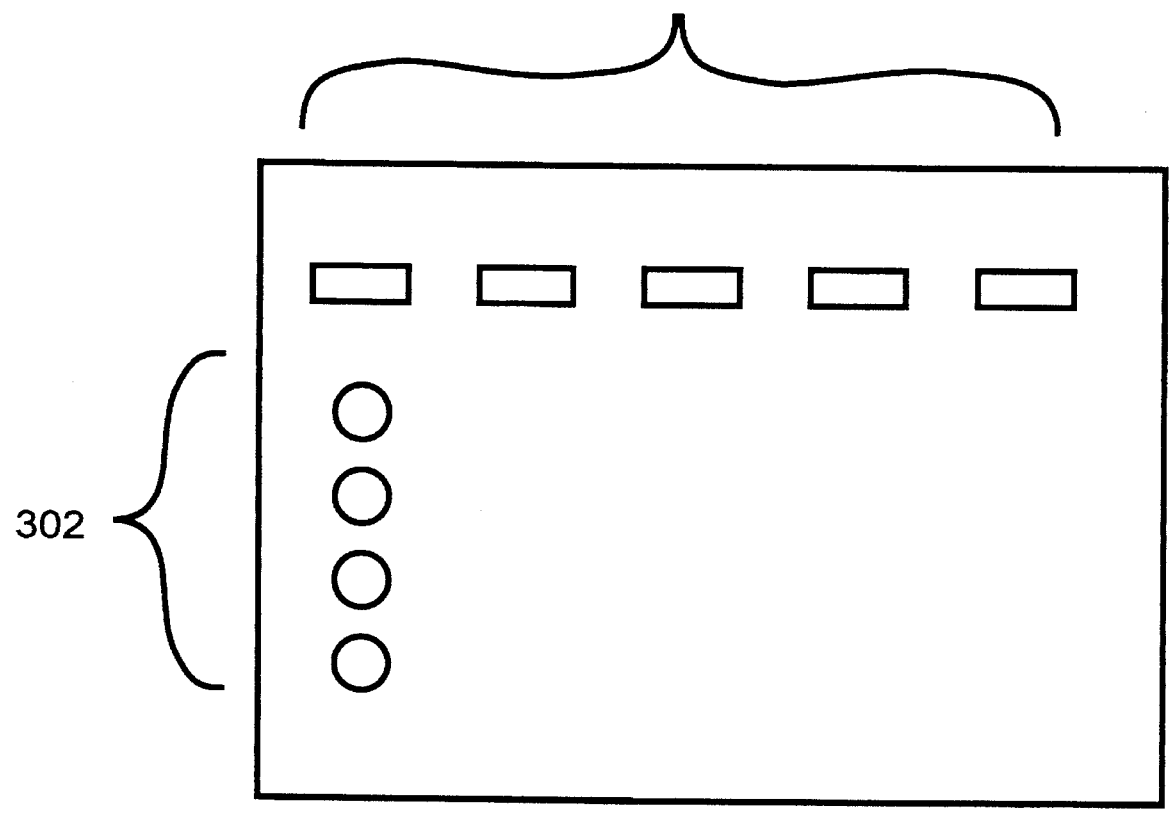
FIG. 6 is a chart showing the cooperation of a compression algorithm with a transmission algorithm in accordance with the present invention.

Referring now to FIG. 6 what is shown is a block representation of a matrix of compression algorithms with transmission algorithms that could be utilized in accordance with the present invention. The circles 302 aligned in the vertical direction are the compression algorithms. The rectangles 304 aligned in the horizontal direction are the transmission algorithms.

For example, the compression algorithms could be JPEG, a generator with MIDI, and a key for a weather map background. Similarly, the transmission algorithms could be optimized for JPEG, data compression for MIDI, or DTMF for key transmission type algorithms. To provide the highest quality multimedia information while at the same time utilizing minimum bandwidth the different algorithms can be selected in an interactive manner.

Hence, a first compression algorithm could be selected along with the first transmission algorithm. The multimedia information is reviewed either for image or audio quality, then a second compression algorithm is selected. The multimedia information is reviewed and if the quality is not acceptable, then a second transmission algorithm is selected. The quality of the information is again reviewed. This process is repeated until the highest or desired quality multimedia information and interactivity speed are provided.

The multimedia information derived from the compression/transmission algorithms can be analog or digital in nature. However, in a digital signal there are certain other features that can be taken advantage of that can be utilized in accordance with the present invention.

It is known that digital data information is typically sent in a file which specifies certain parameters of that data and the data information itself, and within the data information itself is information which may not change for a certain set of files. In the case of an image file, the header information may specify the dimensions, pixel depth, and certain other features of the particular image. This file may take up a much as twenty percent of the data file.

Conversely, in a file such as MIDI music file which comprise a plurality or a series of music notes, the header may include instrument information, related information and characteristics of that particular file. In both of the above mentioned examples, the header information may not change. Through the use of the optimization method the amount of information may be significantly reduced over time.

Hence, in the case of the image file, the header could be sent first with no compression or with lossless data compression as the secondary file because it will always remain the same. The date file itself can then be compressed down to its smaller size.

Another method for enhancing the psychographic parameters is to provide some form of error detection and adjustment. As has been mentioned before the detection and adjustment can be accomplished via interpolation of the error. An alternative method of error corrector is through an error correction/transmission algorithm. What is meant by this, is relating the transmission to the compression to enhance interactivity.

In this type of system before the file is sent, the base file is compressed and then decompressed. This decompressed file is called an expanded compressed base file. The expanded compressed base file is then compared to the original base file and an error file is then developed (the error file being the difference between the base file and the expanded compressed base file). The error file is compressed and sent along with the compressed version of the base file down the line. These files are then combined and decompressed to provide an enhanced image.

Figure 7A:
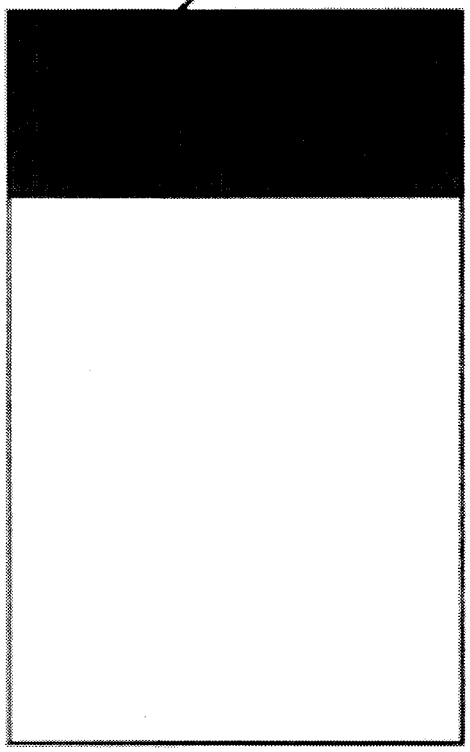
FIGS. 7A and 7B are block representations of digital information of an image file and a MIDI file.
Figure 7B:
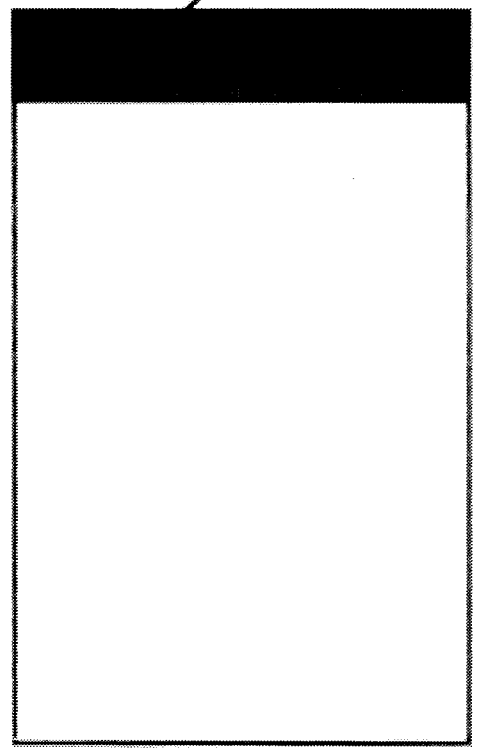

Referring now to FIGS. 7A and 7B it is seen that a data file utilizing this technique could initially be separated into primary and secondary layers. The primary layer could be compressed using a first compression algorithm, the header could be sent first along a first transmission path and the compression signal could be sent along a second transmission path.

Therefore, the amount of storage necessary for the file is significantly reduced through secondary compression techniques. This information can then be transmitted or stored across the network rather than having to have all that information stored within a particular device within the optimization system.

It should be understood by one of ordinary skill in the art will recognize that the number of algorithms is not limited to the number shown in the figures. In addition it should be recognized that the order or the selection of the algorithms could be changed and that would be within the spirit and scope of the present invention.

The present invention has been discussed in terms of compressing the primary layer or layer and by compressing and transmitting that primary layer in a particular way the interactivity of the system is enhanced. It should be understood that it may be equally important to enhance secondary layers to produce the same effect.

Therefore, it may be important to enhance the secondary layer, it may be important to enhance the primary layer or it may be important to enhance both. Therefore, the present invention through the use of compression and transmission algorithms and through the psychographic enhancement of the program model can enhance interactivity of a multimedia system.

It should also be understood that the function of the compression and transmission algorithms can also be done through other means; for example, a signal generator could be used to provide the same information. That is, a signal generator responsive to a particular layer or layer of information could be utilized to provide that information or some level of information that is representative of that layer. For example, a tone generator responsive to a signal from the secondary layer to provide the tone that would be representative of that secondary layer.

Conversely, some type of graphics generator could be utilized to respond to that same type of signal to provide a certain type of graphic image in a video system. Finally, it should also be understood that the psychographic parameters can be adjusted by human operator or in the alternative can be adjusted or modified by an automatic means.

Figure 8:
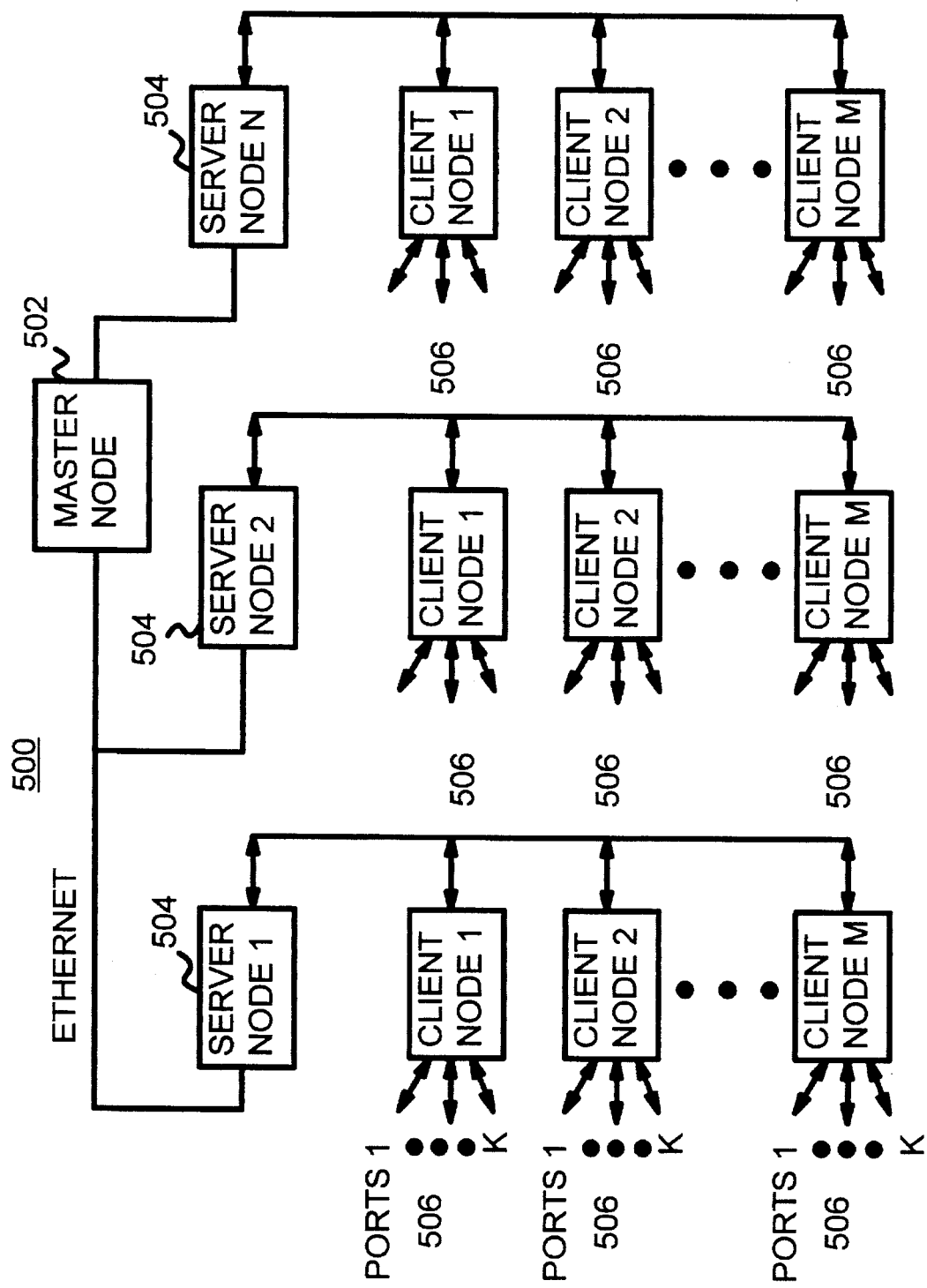
FIG. 8 is a block representation of the multimedia call processing system (MCPS) in accordance with the present invention.

The optimized multimedia information from the program source material is then processed by the MCPS 44 (FIG. 2) to be utilized interactively with IMDs 52. Referring now to FIG. 8 what is shown is the preferred embodiment of a MCPS 44. The MCPS comprises a distributed computing architecture 500. The distributed computing architecture 500 includes a master node 502 that has several server nodes 504 which in turn are connected to several ports 506. When connected via the existing networks, such as to a switched telephone network and then on to connection to the IMD 52, which has its own processing storage and computing structure the entire network can be operated as a massive distributed computing environment. This environment shares all dimensions of computing, storage, transmission and peripheral resources (printing, product ordering, mailing functions, etc.). This type of computing architecture would include dynamic port allocation and would include incremental failure characteristics to allow for robustness of the MCPS 44.

It also is very important in this system architecture to have an interactive multimedia device 52 which will allow for the receipt of high quality multimedia information from the system architecture. The IMD 52 can be a printer that has been attached to a video display. It can also be a facsimile machine which could be utilized to received enhanced facsimile-like information. The IMD 52 can also be utilized with a television monitor to provide enhanced audio, video and graphic information thereto. Other connections to common household devices such as a VCR and household heating control systems can also be utilized by the IMD 52.

Figure 9:
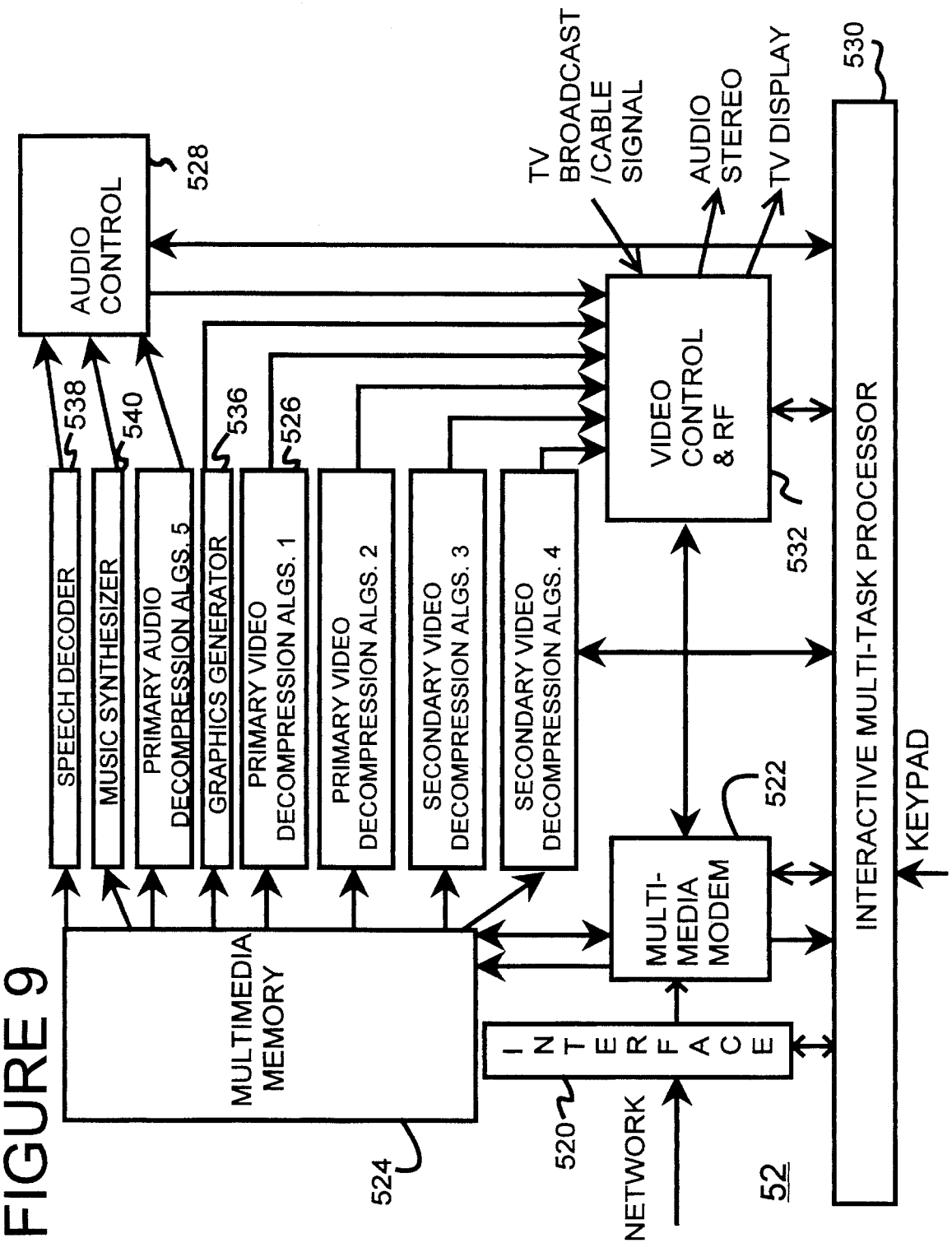
FIG. 9 is a block diagram of a general embodiment of an interactive multimedia device (IMD) in accordance with the present invention.

FIG. 9 is a preferred embodiment of an interactive multimedia decoder (IMD) 52A. The IMD 52A comprises several components. The telephone line is coupled to a multimedia modem 522. The multimedia modem is coupled to a multimedia memory 524 which can be an expandable dynamic random access memory (DRAM) 524. The multimedia modem chip 522 provides data to a multimedia decompressor device 526. The multimedia memory provides data to graphics/character generator 536, speech generator 538 and music synthesizer 540.

In addition, the output of the generators 536, 538 and 540 are provided to a video control chip 532. Video control 532 provides signals to a standard television display and receives signals from a standard television source. The multimedia modem 532, the multimedia memory 524, the multimedia decompressor 526, the multimedia digital/audio control 528, the video control 532 and music synthesizer 544 are all ultimately controlled by an interactive control interface 530 which manages the operation of all of the above elements. The video control 532 is coupled to a standard telephone keypad input or for a television remote-type device or a special IMD remote can be utilized in a variety of ways which will be discussed in detail hereinafter.

Personalized and demographic information (such as the age, race, sex and other personal characteristics) of the user along with the technical information associated with the IMD 52 (serial no., number of generators, type etc.). Upon connecting the IMD 52 to the MCPS 44, the IMD 52 can both forward this information either at the beginning of the session or any time afterward. The information can then be updated through the MCPS 44 or directly through the IMD 52 using a keypad or remote control or by receiving data from the MCPS 44.

Another mode of operation is the delivery of multimedia during the period when a communication network is not in use. In this way, large amounts of multimedia information can be efficiently transmitted and stored in the IMD 52 for IMD for later review and enhanced interactivity.

The function of each of the different components in a preferred embodiment is described in a summary fashion below.

Multimedia Modem 522 a. Responsible for all communications between standard phone line, optional serial port, interface to multimedia memory, multimedia decode, audio control, and processor control modules.
B. Supports standards protocol for half-duplex, full duplex, and half-duplex high speed operation.
C. On-chip encode/decode capability, D/A, A/D for voice, facsimile, and data functions.
D. Dual tone multi-frequency (DTMF) detect and generation.
E. Auto-detect voice/facsimile/data switch for transparent mode transition.
F. Incorporates controller unit with binary file transfer, facsimile, data, and voice modes, and optional proprietary multimedia processor control optimized protocol firmware.
G. Firmware allows IMD to use multimedia modem to perform call processing function including telephone call dialing and connection, unattended receipt of data and fax among other functions.

Multimedia Memory 524 a. Nominal DRAM or VRAM for image mixing/processing, and auxiliary multimedia data store.
B. Nominal ROM for resident IMD control program.
C. Optional co-resident DRAM for multimedia data store and program/data store.
D. Optional non-volatile storage (extendible).
E. Memory control unit for VRAM/ROM/DRAM and non-volatile storage.

Multimedia Decode 526 a. Responsible for real-time decompression of images transferred to or stored in the IMD 52 with multiple algorithm coding.
B. On chip inverse discrete cosine transform processor.
C. Reverse quantizer decoder/tables.
D. Built-in zoom, pan, chroma key, mix from compressed data incorporates interfaces to video data bus, multimedia memory, multimedia modem, video control, and microprocessor control sections.

Video Control 532 a. Responsible for all IMD 52 video mixing, enhancements, and display functions.
B. Pixel processor for mix, zoom, pan, chroma key, transform on pixel data, transitions.
C. Graphics processor for figures (e.g., rectangles with color fill) generation, sprites, text with foreign characters, and scrolling.
D. Digital to analog conversion, analog to NTSC, NTSC video plus stereo audio to RF.

Graphics/Character, Speech Generator, Music Synthesizer 536, 538 and 540 a. Responsible for enhancing received analog/digital audio, music synthesis generation, and overall analog mixing and audio effects.
B. Incorporates decoding burden.
C. Sampled instrument synthesis from compressed MIDI input.
D. Built-in micro-controller for multi-task generation.
E. Dual analog source mix, digital audio and synthesizer mix, analog audio control (volume, bass, treble, balance) for output to analog left/right audio.

Interactive Multi-Task Processor 530

A. Responsible for multi-task execution of resident and downloaded IMD code for operation in conjunction or independently of the MCPS.
B. Master/slave microcontroller architecture for multi-task control of communications, multimedia memory, multimedia decode, digital video control, digital audio/synthesis, and interface management.

In a preferred embodiment, the IMD 52 (FIG. 2) will be utilized with a television monitor to transmit and receive multimedia information.

Figure 10:
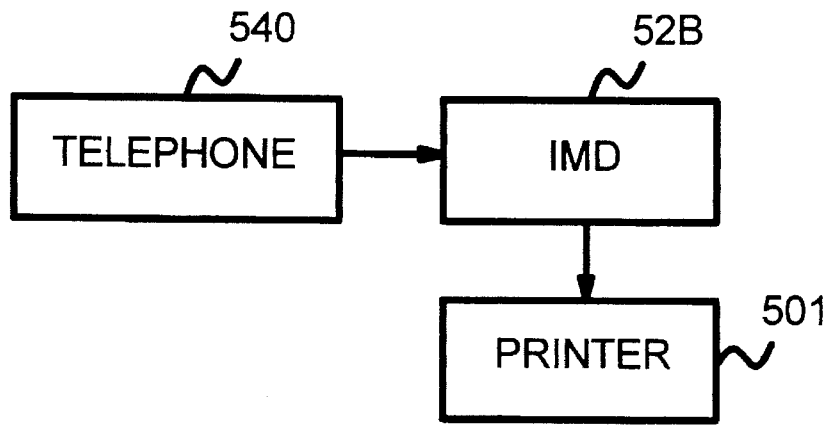
FIG. 10 is a block diagram of a second embodiment of an IMD in which the IMD is connected to a printer in accordance with the present invention.
Figure 11:
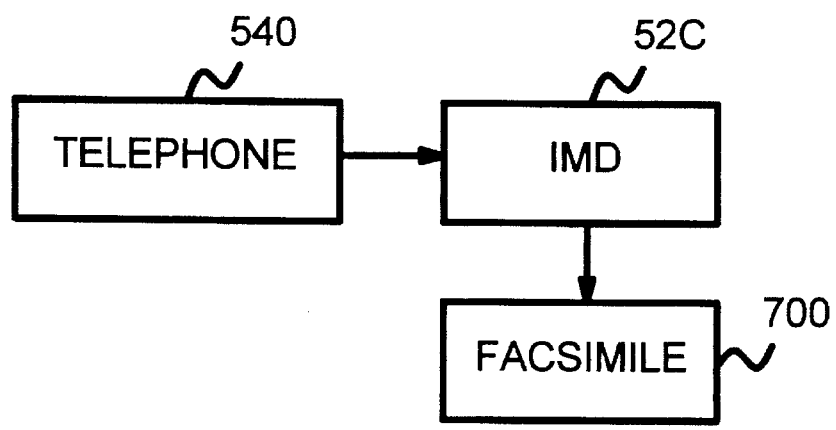
FIG. 11 is a block diagram of a third embodiment of an IMD in which the IMD produces a facsimile in accordance with the present invention.

FIGS. 10, 11 and, 12 show different embodiments of an IMD 52. FIG. 10 shows an IMD 52B which has an output to a printer 501 and a telephone handset 540. The printer 501 then is utilized to print multimedia information responsive to the telephone handset.

FIG. 11 shows an IMD 52C that has an output to a television 700 and will print facsimile-like information received from the system architecture 40. This so-called FAX IMD 52C includes a facsimile machine internal thereto.

Figure 12:
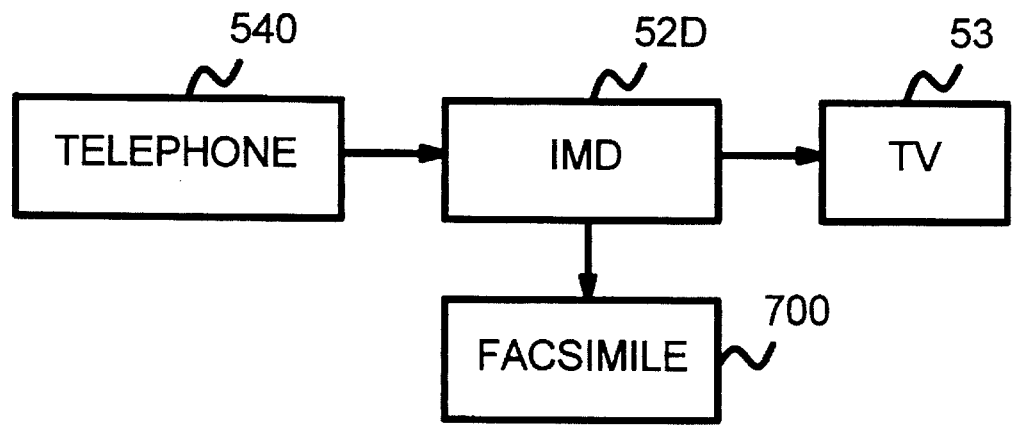
FIG. 12 is a block diagram of a fourth embodiment of an IMD in which the IMD is connected to a facsimile machine in accordance with the present invention.

FIG. 12 shows an IMD 52D that has an output to a television 53 and also has an output connected to a fax machine. This will allow for a viewer to view the incoming facsimile messages and other multimedia information and then print them via a fax machine.

Yet another preferred embodiment of the present invention comprises a MCPS 44 which incorporates a standard voice response computer or interactive voice response system or the like to perform digital or analog voice functions of the MCPS 44. In addition this apparatus would also perform the DTMF functions for MCPS program control. To perform the multimedia information transmission to the IMD 52 and to control the switching between voice data, fax the system would utilize a modification to standard voice response systems, interactive voice response system or a modification thereof. By utilizing the appropriate IMD 52 protocol reconnection to a standard telephone through the above mentioned modified systems. Accordingly, either one standard telephone line or a plurality of telephone lines operating in parallel may be utilized for transmission from the MCPS 44 to the IMD 52.

Figure 13:
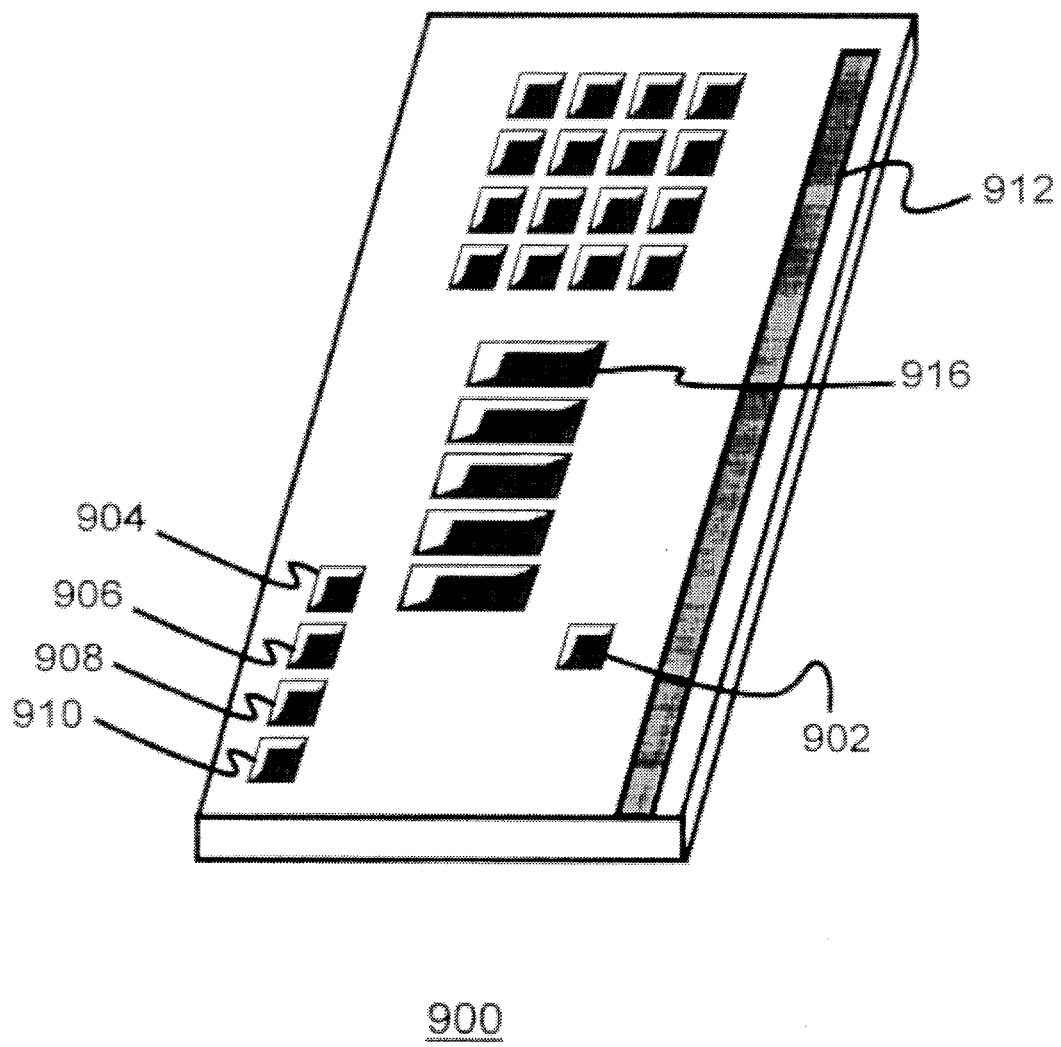
FIG. 13 is a representation of a remote control utilized in conjunction with the system architecture of the present invention.

Another critical feature of the IMD is to have a remote control that will work in conjunction with the TV or other display or the like to provide enhanced multimedia information. To more fully explain this feature refer now to FIG. 13. The remote control 900 looks much like a telephone keypad. It has the numerals (0–9) and symbols (*#) that are part of an ordinary telephone keypad. It includes an enter key 902 that is typically utilized to change information or change channels in the case of a television set.

The control 900 would also include a volume key 904 and a channel or memory select key 906, a connect key 908 and a multimedia toggle button 910. It could also include a credit card slot 912. This credit card slot 912 would be utilized by the viewer to allow for the purchase of certain items directly while viewing the television screen.

Finally, the control 900 includes special effect keys 916, for example, for allowing for the browsing of a multimedia directory while simultaneously displaying a picture in the picture of the current broadcast TV channel.

The remote control 900 could utilize a radio frequency signal or audio signal to interact with the receiver and/or IMD 52 for the control of the IMD, control the selection of multimedia information, and for the control of other household devices. It is also known that a more conventional remote control could be utilized such as one that controls a VCR or a television and its use would be within the spirit and scope of the present invention.

Another feature of the above-identified system architecture 40 of FIG. 2 is that the program information can be linked to the network to provide for enhanced interactivity and program quality. For example, the program source can follow or be synchronized with the cable or broadcast feed to provide for enhanced distribution of program information. One specific example of this to take a new program, like CNN broadcasting, which consists of several short news items. For each news there could be stored large archives or program material related to a particular story. Hence, through multimedia interaction with for, example, the remote control 900 the stored program material can be accessed. This would allow the user to review the material in whatever detail was desired.

Another example, is in an advertising feed if a particular item was advertised, there would be the ability to refer to more detailed information about the product.

Yet another example of such a system is to have one service linked to another. An advertisement could be linked to a means for ordering the particular product being advertised including the placement of a phone call by the IMD to the desired telephone number. In so doing, the linked system allows for additional services to be accessed.

The important requirements for this linked feature is that there is a knowledge of the contents of the system program requirements and there is a knowledge of where the user is in the program. For example, an IMD could be used for channel program identification in which the telephone call is linked to a particular channel that has been selected. Another example is link demographics for targeted interactive advertising. hence, in an advertisement for a diaper, for example, there would be the facility to access advertisements for related items such as baby powder, baby oil or the like through the use of this linked approach.

It should be understood that the IMD 52 itself could be utilized as a call processing system. Finally, it should be understood that there could be multiple MCPS 42 to provide for very large scale call processing.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

What is claimed is:

1. A communications system for transmitting interactive multimedia information over a communication medium having limited bandwidth, the system comprising:

interactive multimedia mastering (IMM) system means for receiving multimedia program materials from a program source, the IMM system including means for optimizing the program materials by separating the information into primary and secondary layers using psychographic parameters to differentiate between important and less important multimedia information, the program materials further optimized by enhancing information in the primary layers to provide a perceived improvement in the quality of the information when presented to a user, and by compressing at least a portion of the optimized program materials to reduce the bandwidth required to transmit the optimized program materials, the optimized program materials including a plurality of program branches where each of the branches allows a plurality of functions and data to be accessed in order to replicate the program source;

a multimedia call processing system (MCPS) coupled to the IMM for receiving and distributing the optimized program materials from the IMM; and a plurality of interactive multimedia devices (IMDs) for receiving the optimized program materials from the MCPS, the plurality of the IMDs including means for accepting user commands for multimedia information and for responsively transmitting a control signal to the MCPS, the MCPS including a voice mode means responsive to the control signal for branching to a program branch in the optimized program materials indicated by the control signal, the MCPS including means for switching to a data mode for transmitting data from the indicated program branch back to the at least one of the plurality of IMDs and then switching back to the voice mode to accept further control signals from the at least one of the plurality of IMDs, whereby only selected portions of the optimized program materials are sent from the MCPS to the IMDs thereby further reducing the bandwidth required to transmit the multimedia program materials.

2. The system of claim 1 in which the IMM system provides for subjective control of the quality of the multimedia information, wherein the subjective control is controlled by user feedback.

3. The system of claim 1 in which the IMM system provides for objective control of the quality of the multimedia information through the use of a quality metric.

4. The system of claim 1 in which the multimedia call processing system further comprises:

means for creating multiple multimedia files for use by the multimedia mastering system.

5. The system of claim 1 in which the interactive multimedia devices are coupled to a printer to print information from the multimedia network.

6. The system of claim 5 in which the interactive multimedia devices are coupled to a display.

7. The system of claim 5 in which each of the interactive multimedia device has the ability to store information related to demographics and the characteristics of the interactive multimedia device and thereafter forward the information at an appropriate time.

8. The system of claim 7 in which interactive multimedia device can delay transmission of information stored there within until the communication network is not in use.

9. The system of claim 7 in which the display comprises a television.

10. The system of claim 9 in which control of the transmission of program source material is accomplished using a standard voice response system.

11. The system of claim 9 in which control of the transmission of program source material is accomplished using an interactive voice response system.

12. The system of claim 9 in which control of the transmission of program source material is accomplished using a computer processing system.

13. The system of claim 10 in which a facsimile machine is connected to the IMD.

14. The system of claim 9 in which a telephone handset is used to control and select the transmission and presentation of program source material.

15. The system of claim 9 in which telephone keypad is used to control and select the transmission and presentation of program source material.

16. The system of claim 9 in which a remote control is used to control and select the transmission and presentation of program source material.

17. The system of claim 10 in which the IMD comprises a music synthesizer and a multimedia decompression means for generating program source material.

18. The system of claim 10 in which the IMD comprises a music synthesizer and a key coding means for generating program source material.

19. The system of claim 10 in which the IMD comprises a music synthesizer and a generator means for generating program source material.

20. The system of claim 10 in which utilizes switching between data, voice and facsimile on a single telephone line to transmit program source material.

21. The system of claim 10 in which utilizes switching between data, voice and facsimile on multiple telephone lines to transmit program source material in parallel.

22. The system of claim 10 in which certain portions are designated as primary program material portions and certain portions of the MCPS are designated as secondary program material portions and are used to communicate primary and secondary multimedia information.

23. The system of claim 22 in which program transmission can occur simultaneously.

24. The system of claim 22 in which program material transmission can occur at a specified period of the day.

25. The system of claim 22 in which the program transmission can occur when the telephone line is not being utilized.

26. An interactive multimedia system for providing interactive multimedia information to a user over a communication network, the system comprising:
   an interactive multimedia mastering system (IMMS) including,
      means for separating multimedia information into primary and secondary layers based upon a program model,
      means for enhancing the layers in accordance with the program model to enhance user interactivity of the multimedia information, the layers being enhanced through selective use of an objective quality standard that includes metrics of the quality of the layers, and a subjective quality standard that is controlled by user feedback,
      means for compressing at least a portion the enhanced layers creating compressed layers and uncompressed layers, and
      means for transmitting the compressed and uncompressed layers over the communication medium; and
   an interactive multimedia device (IMD) including,
      communication means for receiving the compressed and uncompressed layers from the communication medium,
      memory means for storing the compressed and uncompressed layers,
      means for decompressing the compressed layers,
      means for mixing the decompressed layers with the uncompressed layers, and
      means for interactively controlling the communication means, memory means, decompressing means, and mixing means to provide enhanced interactive multimedia information to a display.

27. A system for interactively providing enhanced information related to a communication network, the network including a first set of pro,ram source materials that is produced for a user, the network further including a second set of pro,ram source material that is related to the first set of program source material, the second set of program source material is stored in a separate layer than the first set of program source material, the system comprising:
   means for linking the first set of program source material with the second set of program source material in synchronization, the first set of program source material being a different media type than the second set of program source material;
   means coupled to the linking means for controlling the quality of the first and second sets of program source materials by selective use of an objective quality standard that includes metrics of the quality of the layers, and a subjective quality standard that is controlled by user feedback, and
   means for interactively producing the second set of program source material; wherein the user of the system can produce additional information related to the first set of program source material.

28. The system of claim 27 including means for simultaneously displaying the second set of program source material with the first set of program source material.

29. The system of claim 27 in which the second set of program source materials provides more detailed information related to the first set of program source materials.

30. The system of claim 27 in which the second set of program source materials provides information that is different from but related to the first set of program source materials.

31. The system of claim 27 in which the interactively producing means interactively displays the second set of program source material while the first set of program source material is produced.

32. The system of claim 27 which further comprises means for selecting related services based upon the second set of program source material.

* * * * *

(12) EX PARTE REEXAMINATION CERTIFICATE (7443rd)

United States Patent
Lewis

(10) Number: US 5,564,001 C1
(45) Certificate Issued: Apr. 6, 2010

(54) METHOD AND SYSTEM FOR INTERACTIVELY TRANSMITTING MULTIMEDIA INFORMATION OVER A NETWORK WHICH REQUIRES A REDUCED BANDWIDTH

(75) Inventor: Scott W. Lewis, Saratoga, CA (US)

(73) Assignee: 1ST Technology LLC, Los Gatos, CA (US)

Reexamination Request:
No. 90/009,075, Mar. 12, 2008

Reexamination Certificate for:
Patent No.: 5,564,001
Issued: Oct. 8, 1996
Appl. No.: 08/265,391
Filed: Jun. 24, 1994

Related U.S. Application Data

(63) Continuation-in-part of application No. 07/975,824, filed on Nov. 13, 1992, now Pat. No. 5,325,423.

(51) Int. Cl.
*H04M 11/00* (2006.01)
*H04N 7/00* (2006.01)

(52) U.S. Cl. ............... 715/201; 348/E7.081; 379/93.08; 725/116; 725/119

(58) Field of Classification Search ........................ None
See application file for complete search history.

(56) References Cited

U.S. PATENT DOCUMENTS

| | | |
|---|---|---|
| 1,213,804 A | 1/1917 | Cahill |
| 4,504,860 A | 3/1985 | Nicol et al. |
| 4,787,085 A | 11/1988 | Suto et al. |
| 4,885,747 A | 12/1989 | Foglia |
| 4,897,867 A | 1/1990 | Foster et al. |
| 4,920,432 A | 4/1990 | Eggers et al. |
| 4,924,303 A | 5/1990 | Brandon et al. |
| 4,926,256 A | 5/1990 | Nanba |
| 4,935,924 A | 6/1990 | Baxter |
| 4,974,253 A | 11/1990 | Hashimoto |

(Continued)

FOREIGN PATENT DOCUMENTS

| EP | 0488289 | 6/1992 |
|---|---|---|
| WO | WO 90/13086 | 11/1990 |

OTHER PUBLICATIONS

William F. Schreiber and Andrew B. Lippman, "Reliable EDTV/HDTV Transmission in Low–Quality Analog Channels", SMPTE Journal, Jul. 1989, pp. 496–503.

(Continued)

*Primary Examiner*—Woo H. Choi

(57) ABSTRACT

A system and device is provided that enhances the interactivity of multimedia information across a communications network or in combination with other networks including telecommunication and cable broadcasting. The system includes an interactive multimedia mastering (IMM) system for receiving multimedia program materials from a program source, a multimedia call processing system (MCPS) coupled to the IMM, and a plurality of interactive multimedia devices (IMDs) for distributing multimedia information to users. The IMM optimizes the program materials by separating the information into primary and secondary layers using psychographic parameters to differentiate between important and less important multimedia information, and then compresses at least a portion of the layers for transmission to the MCPS. The IMDs accept user commands for multimedia information from a telephone, which cause the IMD to transmit a control signal to the MCPS. The MCPS receives the control signal while in a voice mode, and in response, branches to a program branch in the optimized program materials indicated by the control signal. The MCPS switches to a data mode for transmitting data from the indicated program branch back to the requesting IMD, and then switches back to the voice mode to accept further control signals from the IMD. Once the IMD receives the materials, the IMD decompresses any compressed portions and mixes the decompressed portions with the uncompressed portions to provide enhanced interactive multimedia information to the user.

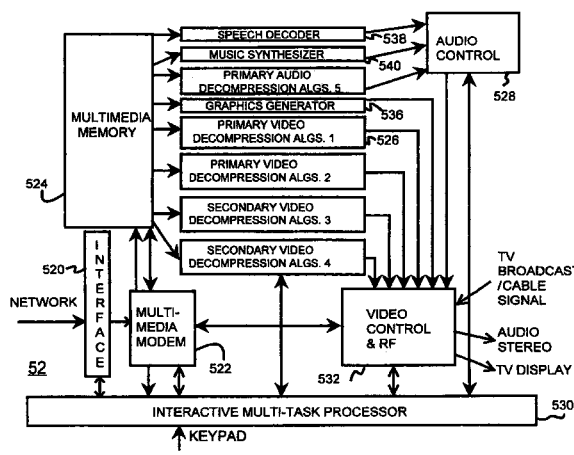

U.S. PATENT DOCUMENTS

| | | |
|---|---|---|
| 4,994,908 A | 2/1991 | Kuban et al. |
| 5,008,926 A | 4/1991 | Misholi |
| 5,014,125 A | 5/1991 | Pocock et al. |
| 5,027,400 A | 6/1991 | Baji et al. |
| 5,051,822 A | 9/1991 | Rhoades |
| 5,128,776 A | 7/1992 | Scorse et al. |
| 5,148,272 A | 9/1992 | Acampora et al. |
| 5,148,275 A | 9/1992 | Blatter et al. |
| 5,192,999 A | 3/1993 | Graczyk et al. |
| 5,193,208 A | 3/1993 | Yokota et al. |
| 5,194,682 A | 3/1993 | Okamura et al. |
| 5,195,092 A | 3/1993 | Wilson et al. |
| 5,220,420 A | 6/1993 | Hoarty et al. |
| 5,231,484 A | 7/1993 | Gonzales et al. |
| 5,236,199 A | 8/1993 | Thompson, Jr. |
| 5,243,428 A | 9/1993 | Challapali et al. |
| 5,247,126 A | 9/1993 | Okamura et al. |
| 5,247,347 A | 9/1993 | Litteral et al. |
| 5,249,047 A | 9/1993 | Aoki et al. |
| 5,250,747 A | 10/1993 | Tsumura |
| 5,251,209 A | 10/1993 | Jurkevich et al. |
| 5,253,058 A | 10/1993 | Gharavi |
| 5,253,275 A | 10/1993 | Yurt et al. |
| 5,260,783 A | 11/1993 | Dixit |
| 5,262,964 A | 11/1993 | Bonsall et al. |
| 5,268,846 A | 12/1993 | Bonsall et al. |
| 5,283,819 A | 2/1994 | Glick |
| 5,296,643 A | 3/1994 | Kuo et al. |
| 5,318,450 A | 6/1994 | Carver |
| 5,325,423 A | 6/1994 | Lewis |
| 5,333,181 A | 7/1994 | Biggs |
| 5,351,276 A | 9/1994 | Doll, Jr. et al. |
| 5,371,532 A | 12/1994 | Gelman et al. |
| 5,404,393 A | 4/1995 | Remillard |
| 5,412,720 A | 5/1995 | Hoarty |
| 5,414,469 A | 5/1995 | Gonzales et al. |
| 5,414,773 A | 5/1995 | Handelman |
| 5,420,923 A | 5/1995 | Beyers, II et al. |
| 5,426,513 A | 6/1995 | Scorse et al. |
| 5,438,355 A | 8/1995 | Palmer |
| 5,440,336 A | 8/1995 | Buhro et al. |
| 5,477,263 A | 12/1995 | O'Callaghan et al. |
| 5,488,411 A | 1/1996 | Lewis |
| 5,488,412 A | 1/1996 | Majeti et al. |
| 5,497,186 A | 3/1996 | Kawasaki |
| 5,519,436 A | 5/1996 | Munson |
| 5,537,528 A | 7/1996 | Takahashi et al. |
| 5,544,315 A | 8/1996 | Lehfeldt et al. |
| 5,555,244 A | 9/1996 | Gupta et al. |
| 5,565,908 A | 10/1996 | Ahmad |
| 5,565,910 A | 10/1996 | Rowse et al. |
| 5,581,270 A | 12/1996 | Smith et al. |
| 5,590,126 A | 12/1996 | Mishra et al. |

OTHER PUBLICATIONS

Kazutomo Fukuda, Tadayuki Tahara, Toru Miyoshi, "Hypermedia Personal Computer Communication System: Fujitsu Habitat", Fujitsu Sci. Tech. J., 26, 3, pp. 197–206 (Oct. 1990).

"Habitat", http://www.standford.edu/class/history34q/readings/Virtual_Worlds/Habitat.html, Dec. 1, 2003.

F. Randall Farmer, Chip Morningstar, Douglas Crockford, "From Habitat to Global Cyberspace", Dec. 1, 2003.

Chip Morningstar and F. Randall Farmer, "The Lessons of Lucasfilm's Habitat", Dec. 1, 2003.

"The Official Avatar Handbook, A Comprehensive Guide to Understanding Habitat TM", 1987.

Webster's II New Riverside University Dictionary, 1994, p. 950.

Robin Raskin, The article "Multimedia: The Next Frontier For Business", PC Magazine, Jul. 1990, pp. 151–192.

Marshall Rens, "Rabbit Jack's Casino, Experience Vegas–Style Excitement in Rabbit Jack's Casino", pp. 8–10.

Jim Fleming, et al., "NAPLPS: A New Standard for Text and Graphics, Part 1: Introduction, History, and Structure, A close look at an important and controversial new communications standard." Feb. 1983, pp. 203–254, BYTE Publications Inc.

Jim Fleming, "NAPLPS: A New Standard for Text and Graphics, Part 2: Basic Features, How to encode text and simple graphics elements in a standard and efficient manner." Mar. 1983, pp. 152–185, BYTE Publications Inc.

Jim Fleming, "NAPLPS: A New Standard for Text and Graphics, Part 3: Advanced Features, NAPLPS can draw irregular lines, compress repeated code segments, define new text characters, and divide the display screen into separate fields." Apr. 1983, pp. 190–206, BYTE Publications Inc.

Jim Fleming, "NAPLPS: A New Standard for Text and Graphics, Part 4: More Advanced Features and Conclusions, A standard way to encode color mapping and animation, closing with some predictions on how NAPLPS will be used by personal computers." May 1983, pp. 272–284, BYTE Publications Inc.

CL 01650–CL 01662, Feb. 13, 2003, Oct. 2, 2003, Nov. 21, 2003.

US 5,564,001 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–32 is confirmed.

New claims 33, 45–56, 58 and 59 are added and determined to be patentable.

33. *An interactive multimedia system for providing interactive multimedia information to a user over a communication network, the system comprising:*
  *an interactive multimedia mastering system (IMMS) including,*
  *means for separating multimedia information into primary and secondary layers based upon a program model,*
  *means for enhancing the layers in accordance with the program model to enhance user interactivity of the multimedia information, the layers being enhanced through selective use of an objective quality standard that includes metrics of the quality of the layers; and*
  *a subjective quality standard that is controlled by user feedback, wherein enhancing the layers includes utilizing information to operate on the multimedia information, operate in conjunction with the multimedia information or operate as a supplement to the multimedia information,*
  *means for compressing at least a portion of the enhanced layers creating compressed layers and uncompressed layers, and*
  *means for transmitting the compressed and uncompressed layers over the communication medium; and*
  *an interactive multimedia device (IMD) including,*
  *communication means for receiving the compressed and uncompressed layers from the communication medium,*
  *memory means for storing the compressed and uncompressed layers,*
  *means for decompressing the compressed layers,*
  *means for mixing the decompressed layers with the uncompressed layers, and*
  *means for interactively controlling the communication means, memory means, decompressing means, and mixing means to provide enhanced interactive multimedia information to a display.*

34. *The system of claim 26 in which a facsimile machine is connected to the IMD.*

35. *The system of claim 26 in which the IMD comprises a music synthesizer and a multimedia decompression means for generating program source material.*

36. *The system of claim 26 in which the IMD comprises a music synthesizer and a key coding means for generating program source material.*

37. *The system of claim 26 in which the IMD comprises a music synthesizer and a generator means for generating program source material.*

38. *The system of claim 26 which utilizes switching between data, voice and facsimile on a single telephone line to transmit program source material.*

39. *The system of claim 26 which utilizes a modification to a standard voice response system to control switching between data, voice and facsimile on a plurality of telephone lines operating in parallel to transmit program source material.*

40. *The system of claim 33 in which a facsimile machine is connected to the IMD.*

41. *The system of claim 33 in which the IMD comprises a music synthesizer and a multimedia decompression means for generation program source material.*

42. *The system of claim 33 in which the IMD comprises a music synthesizer and a key coding means for generating program source material.*

43. *The system of claim 33 in which the IMD comprises a music synthesizer and a generator means for generating program source material.*

44. *The system of claim 33 which utilizes switching between data, voice and facsimile on a single telephone line to transmit program source material.*

45. *The system of claim 33 which utilizes a modification to a standard voice response system to control switching between data, voice and facsimile on a plurality of telephone lines operating in parallel to transmit program source material.*

46. *An interactive multimedia system for providing interactive multimedia information to a user over a communication network, the system comprising:*
  *an interactive multimedia mastering system (IMMS) including,*
  *means for separating multimedia information into primary and secondary layers based upon a program,*
  *means for enhancing the layers in accordance with the program model to enhance user interactivity of the multimedia information, the layers being enhanced through selective use of an objective quality standard that includes metrics of the quality of the layers, and*
  *a subjective quality standard that is controlled by user feedback,*
  *means for compressing at least a portion the enhanced layers creating compressed layers and uncompressed layers, and*
  *means for transmitting the compressed and uncompressed layers over the communication medium; and*
  *an interactive multimedia device (IMD) including,*
  *communication means for receiving the compressed and uncompressed layers from the communication medium,*
  *memory means for storing the compressed and uncompressed layers, wherein portions of the layers are stored in the IMD to enhance interactivity,*
  *means for decompressing the compressed layers,*
  *means for mixing the decompressed layers with the uncompressed layers, and*
  *means for interactively controlling the communication means, memory means, decompressing means, and mixing means to provide enhanced interactive multimedia information to a display.*

47. *An interactive multimedia system for providing interactive multimedia information to a user over a communication network, the system comprising:* an interactive multimedia mastering system (IMMS) including, means for separating multimedia information into primary and secondary layers based upon a program model, means for enhancing the layers in accordance with the program model to enhance user interactivity of the multimedia information, the layers being enhanced through selective use of an objective quality standard that includes metrics of the quality of the layers, and a subjective quality standard that is controlled by user feedback, means for compressing at least a portion the enhanced layers creating compressed layers and uncompressed layers, and means for transmitting the compressed and uncompressed layers over the communication medium; and an interactive multimedia device (IMD) including, communication means for receiving the compressed and uncompressed layers from the communication medium, memory means for storing the compressed and uncompressed layers, wherein the program model includes branches; wherein portions of the branches are stored in the IMD to enhance interactivity, means for decompressing the compressed layers, means for mixing the decompressed layers with the uncompressed layers, and means for interactively controlling the communication means, memory means, decompressing means, and mixing means to provide enhanced interactive multimedia information to a display.

* * * * *